US008861108B1

(12) United States Patent
Ikeda

(10) Patent No.: US 8,861,108 B1
(45) Date of Patent: Oct. 14, 2014

(54) MAGNETIC DISK DRIVE AND METHOD FOR CORRECTING DEFECTIVE LOCATION DETECTED USING HEAD DISK INTERFERENCE SENSOR

(71) Applicant: Kabushiki Kaisha Toshiba, Minato-ku (JP)

(72) Inventor: Naomichi Ikeda, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 14/051,848

(22) Filed: Oct. 11, 2013

Related U.S. Application Data

(60) Provisional application No. 61/857,844, filed on Jul. 24, 2013.

(51) Int. Cl.
*G11B 5/02* (2006.01)

(52) U.S. Cl.
USPC .............................................. 360/25; 360/31

(58) Field of Classification Search
None
See application file for complete search history.

(56) References Cited

U.S. PATENT DOCUMENTS

| 6,940,669 | B2 | 9/2005 | Schaenzer et al. | |
|---|---|---|---|---|
| 7,027,263 | B2 | 4/2006 | Ottesen et al. | |
| 7,564,649 | B2 | 7/2009 | Hanchi et al. | |
| 2011/0069410 | A1* | 3/2011 | Kashiwase et al. | 360/75 |
| 2013/0250446 | A1* | 9/2013 | Zeng et al. | 360/46 |
| 2014/0139953 | A1* | 5/2014 | Hatch | 360/234.5 |

FOREIGN PATENT DOCUMENTS

JP            2012-89219            5/2012

* cited by examiner

*Primary Examiner* — Paul Huber
(74) *Attorney, Agent, or Firm* — Oblon, Spivak, McClelland, Maier & Neustadt, L.L.P.

(57) ABSTRACT

According to one embodiment, a first defect detector executes a first scan test. The first scan test includes detecting a defect on a disk using a head disk interference sensor by scanning the disk using a head. The first scan test further includes identifying a range of cylinders indicated by servo data read by a read element when the defect is detected, as a first detected location of the detected defect. A compensator corrects the first detected location to a second detected location based on a position difference. The second detected location corresponds to a position of the head disk interference sensor at a time of detection of the defect.

18 Claims, 13 Drawing Sheets

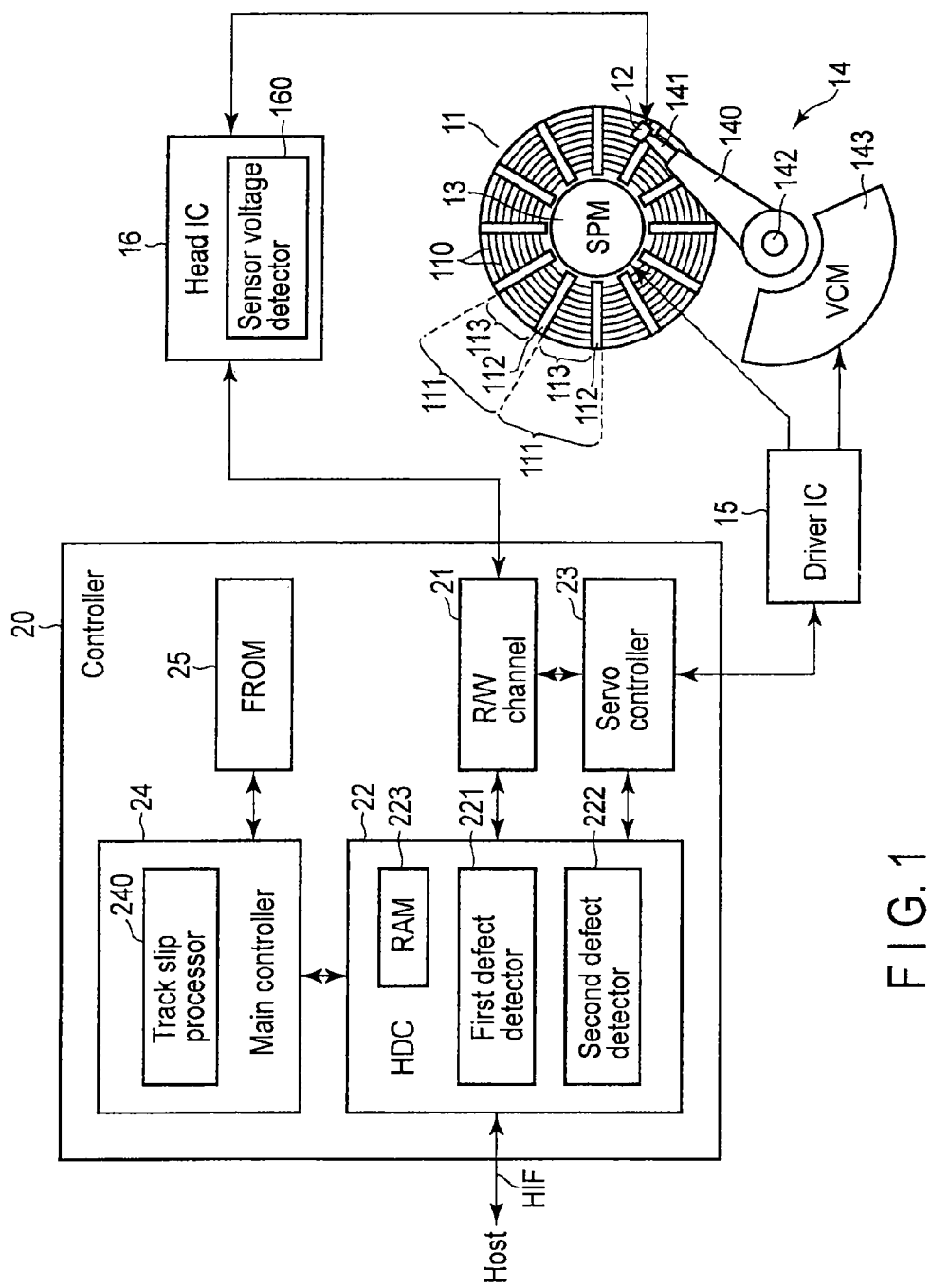
F I G. 1

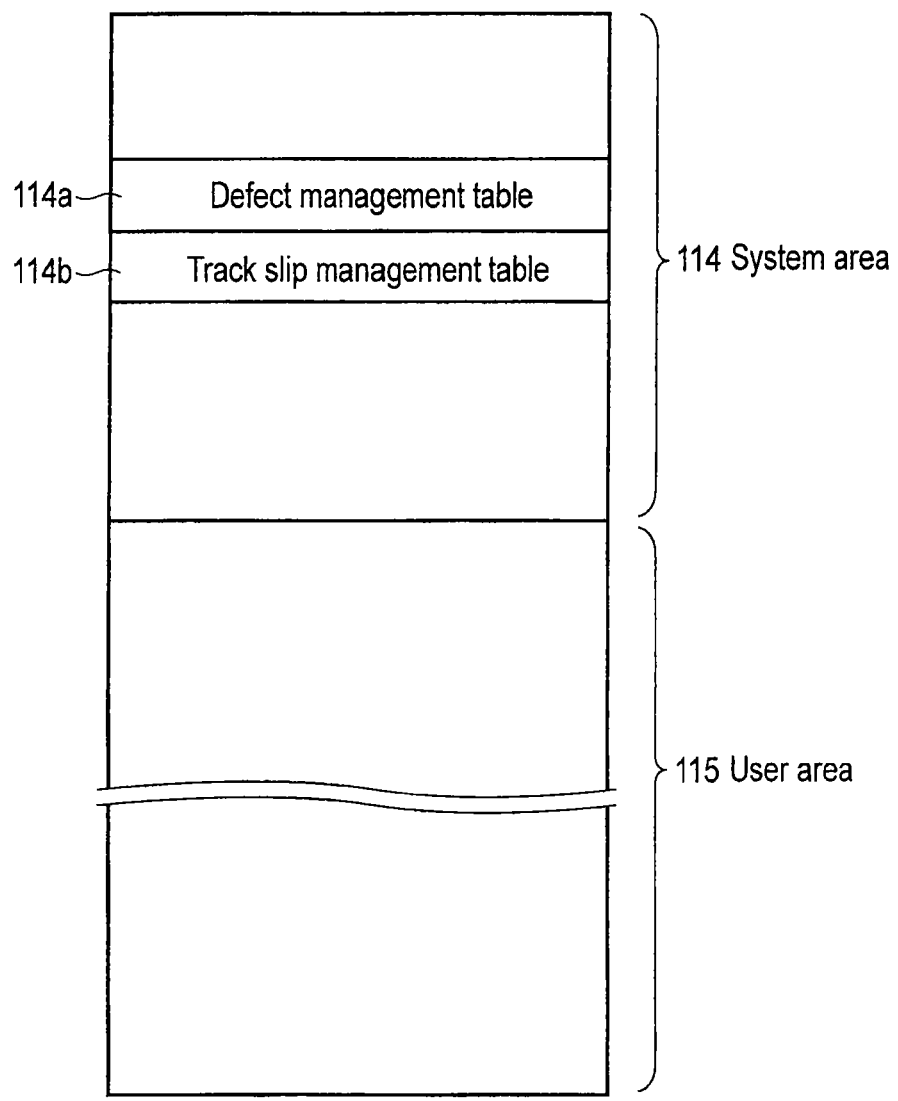
F I G. 2

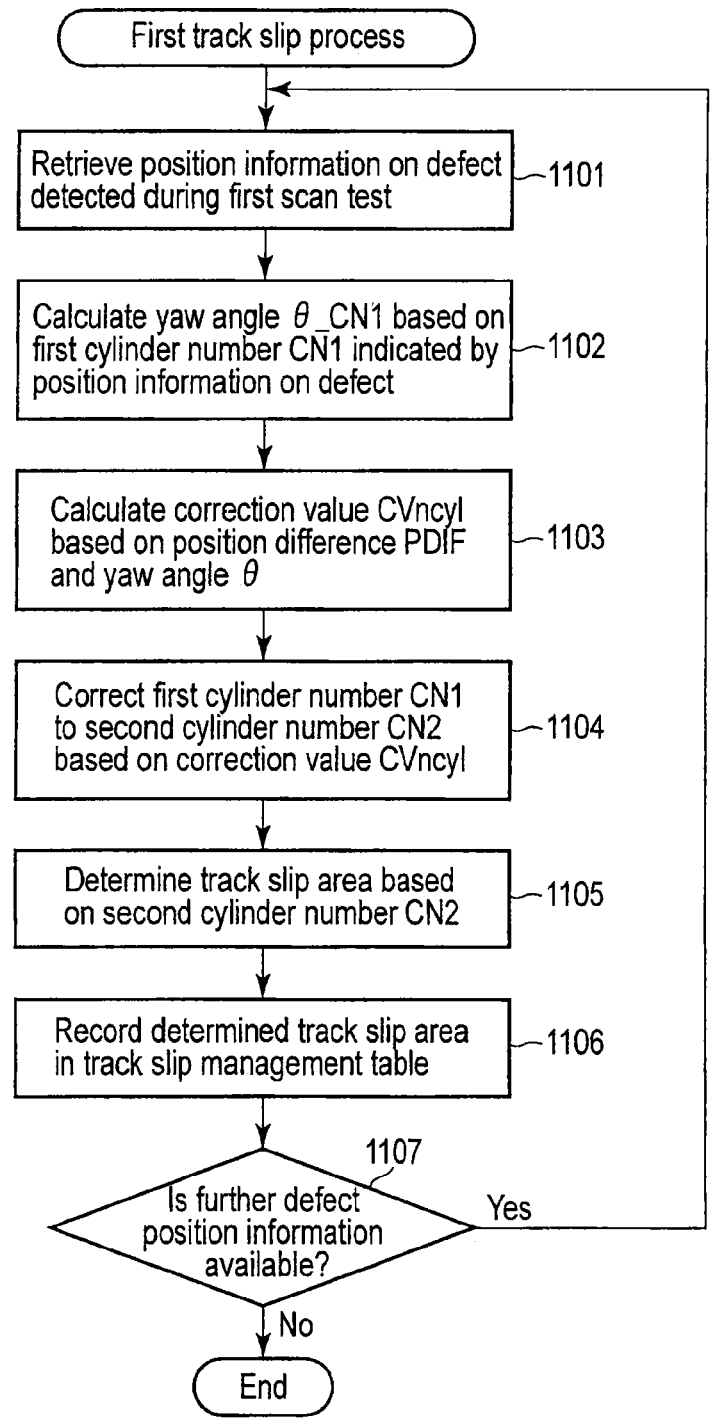
F I G. 1 1

MAGNETIC DISK DRIVE AND METHOD FOR CORRECTING DEFECTIVE LOCATION DETECTED USING HEAD DISK INTERFERENCE SENSOR

CROSS-REFERENCE TO RELATED APPLICATIONS

This application claims the benefit of U.S. Provisional Application No. 61/857,844, filed Jul. 24, 2013, the entire contents of which are incorporated herein by reference.

FIELD

Embodiments described herein relate generally to a magnetic disk drive and a method for correcting a defective location detected using a head disk interference (HDI) sensor.

BACKGROUND

A magnetic disk drive comprises a disk (more specifically a magnetic disk) as a recording medium. Now, it is assumed that a fine projection (hereinafter referred to as a media bump) is present on a disk. This may preclude a head (more specifically a magnetic head) from writing or reading data to or from an area on the disk in which the media bump is present. Furthermore, the head may collide against the media bump and be degraded (or damaged). To avoid such a phenomenon (particularly the collision between the head and the media bump), various methods for detecting a defect such as a media bump which is present on the disk (more specifically a recording surface of the disk) have been proposed.

A known method for detecting a defect on the disk uses an HDI sensor. Like a write element and a read element, the HDI sensor is generally mounted in a head (more specifically, a head slider) for use. The HDI sensor electrically detects interference acting between the head and the disk (that is, interaction), for example, thermal interference. When the HDI sensor detects thermal interference that exceeds a threshold, a location on the disk (for example, a cylinder position) where the read element is positioned is detected as the location of a defect. The defect detection method using the HDI sensor is suitable for detection of a defect such as a media bump against which the head may collide. The defect detection using the HDI sensor is executed by scanning the disk using the head.

For each of all defects detected by the HDI sensor, a controller in the magnetic disk drive determines an area on the disk including a location at which the defect has been detected and the periphery of the location to be a defect area on which a write/read operation should be avoided (hereinafter referred to as a track slip area). Information indicative of the track slip area is recorded in a table (hereinafter referred to as a track slip management table). The controller identifies the track slip area on the disk on which no write/read operation is to be performed based on the track slip management table. The controller avoids writing and reading data to and from the identified track slip area. That is, the controller avoids moving the head to the cylinder area (range) on the disk in which the identified track slip area is present.

However, the location detected as a defect using the HDI sensor is where the read element is positioned at the time of the detection as described above. That is, the location detected as a defect using the HDI sensor is different from a location where the HDI sensor is located at the time of the detection. Thus, when a track slip area is determined without taking this shift of the detected position into account, it is difficult to avoid a possible collision of the head against a media bump during a write/read operation.

On the other hand, when the track slip area is extended in an inner direction and an outer direction of the disk with the shift of the detected position taken into account, a possible collision of the head against a media bump during a write/read operation can be avoided, thereby preventing the head from being degraded. However, when the shift of the detected position is taken into account, the track slip area is extended more than necessary. In this case, locations available as data areas decrease, thereby making a storage capacity needed for the magnetic disk drive difficult to achieve.

The amount of shift of the detected position varies depending on the radial position of the head on the disk. This is because the head moves in the radial direction of the disk so as to draw an arc. That is, the amount of shift varies depending on the yaw angle θ of the head. Thus, the amount by which the track slip area is extended is expected to be varied depending on the yaw angle θ of the head. Even in this case, a track slip area with a large yaw angle θ is extended more than necessary, thereby reducing the locations available as data areas.

BRIEF DESCRIPTION OF THE DRAWINGS

FIG. 1 is a block diagram showing an exemplary configuration of a magnetic disk drive according to an embodiment;

FIG. 2 is a conceptual drawing showing an exemplary format of a recording surface of a disk shown in FIG. 1;

FIG. 11 is a flowchart illustrating an exemplary procedure for a first track slip process in the defect detection and recording process;

DETAILED DESCRIPTION

Figure 3:
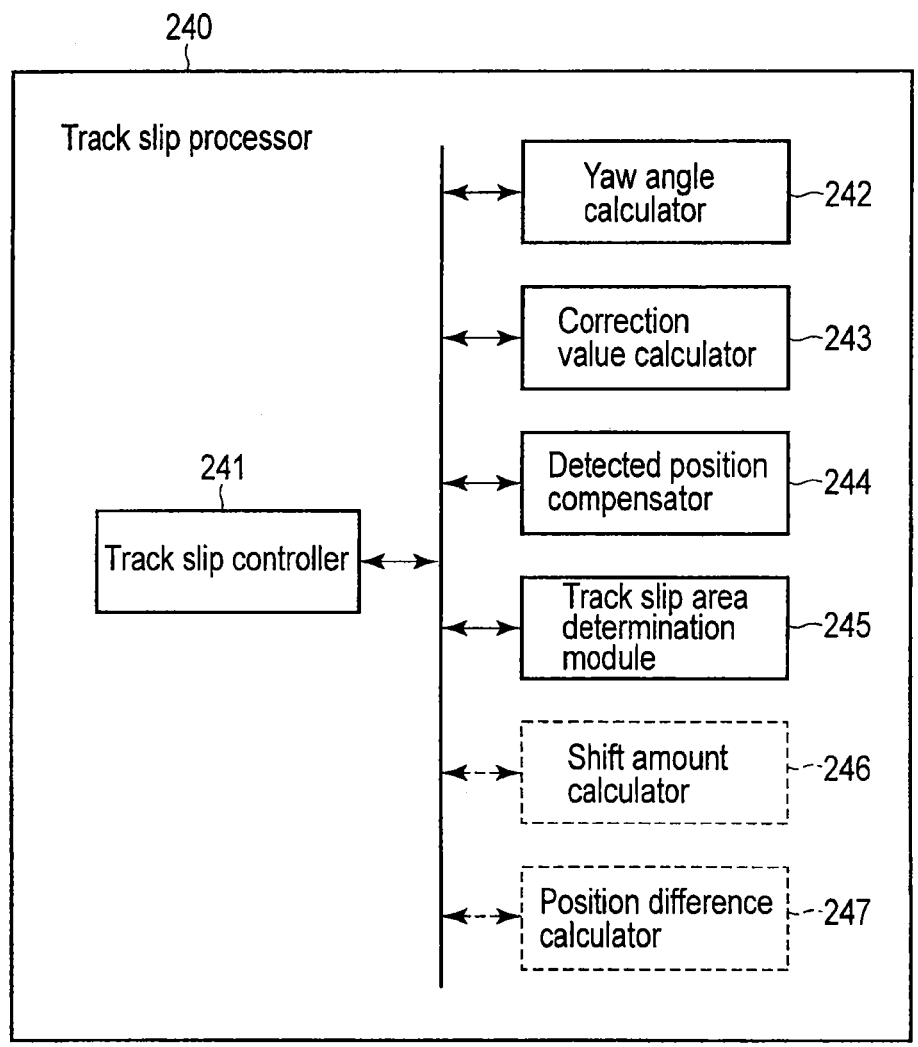
FIG. 3 is a block diagram showing an exemplary configuration of a track slip processor shown in FIG. 1.

Various embodiments will be described below with reference to the drawings.

In general, according to one embodiment, a magnetic disk drive comprises a head, a first defect detector, and a compensator. The head comprises a read element and a head disk interference sensor. The head disk interference sensor is configured to electrically detect interference acting between a disk and the head. The first defect detector is configured to execute a first scan test. The first scan test comprises detecting a defect on the disk using the head disk interference sensor by scanning the disk using the head. The first scan test further comprises identifying a range of cylinders indicated by servo data read by the read element when the defect is detected, as a first detected location of the detected defect. The compensator is configured to correct the first detected location of the detected defect to a second detected location based on a position difference indicative of a distance between the read element and the head disk interference sensor. The second detected location corresponds to a position of the head disk interference sensor at a time of detection of the defect.

FIG. 1 is a block diagram showing an exemplary configuration of a magnetic disk drive according to an embodiment. The magnetic disk drive shown in FIG. 1 comprises a disk (magnetic disk), a head (magnetic head) 12, a spindle motor (SPM) 13, an actuator 14, a driver IC 15, a head IC 16, and a controller 20.

The disk 11, the head 12, the SPM 13, the actuator 14, and the head IC 16 form a head disk assembly (HDA). The head disk assembly is mounted in a disk enclosure (DE) for use. A printed circuit board assembly (PCBA) is mounted on a back surface of the DE. The driver IC 15 and the controller 20 are mounted on the PCBA.

The disk 11 is a magnetic recording medium. The disk 11 comprises, for example, on one surface thereof, a recording surface on which data is magnetically recorded. The disk 11 is rotated at high speed by the SPM 13. The SPM 13 is driven by a drive current (or a drive voltage) supplied by the driver IC 15.

The disk 11 (more specifically, the recording surface of the disk 11) comprises, for example, a plurality of concentric tracks 110. The disk 11 may comprises a plurality of spiral tracks. The disk 11 comprises a plurality of servo areas 112. The plurality of servo areas 112 is arranged radially in a radial direction of the disk 11 and discretely at regular intervals in a circumferential direction of the disk 11. An area between adjacent servo areas 112 in each track 110 is used as a data area 113. An area in each track 110, which comprises the servo area 112 and the data area 113 adjacent to the servo area 112, is referred to as a servo frame (or a servo sector) 111. The data area 113 comprises a plurality of data sectors.

Servo data is recorded in the servo area 112. The servo data includes a servo mark, address data, and servo burst data. The servo mark comprises a particular code (pattern signal) used to identify a corresponding servo sector. The address data comprises the address of the corresponding track 110 (cylinder address, that is, a cylinder number) and the address of the corresponding servo frame (servo frame number). The servo burst data comprises data (what is called relative position data) used to detect a shift of the head 12 (position error) from, for example, a centerline of the corresponding track 110.

The head (head slider) 12 is disposed in association with the recording surface of the disk 11. The head 12 is attached to a tip of a suspension 141 extending from an arm 140 of the actuator 14. The arm 140 is pivotally movably supported around a pivot 142. The actuator 14 comprises a voice coil motor (VCM) 143 serving as a drive source for the actuator 14. The VCM 143 is driven by a drive current supplied by the driver IC 15. When the actuator 14 is driven by the VCM 143, this causes the head 12 to move over the disk 11 in the radial direction of the disk 11 so as to draw an arc.

The configuration in FIG. 1 assumes a magnetic disk drive comprising a single disk 11. However, the magnetic disk drive may include a plurality of disks stacked and arranged therein. Furthermore, in the configuration in FIG. 1, the disk 11 comprises a recording surface on one surface thereof. However, the disk 11 may comprise a recording surface on each of the opposite surfaces thereof, with heads arranged in association with the respective opposite surfaces.

The head 12 comprises a write element 121, a read element 122, and a head disk interference (interface) sensor 123 as described later (see FIG. 4A and FIG. 4B). The write element 121 is used to write data to the disk 11, and the read element 122 is used to read data from the disk 11. The head disk interference (HDI) sensor 123 electrically detects interference (that is, interaction) acting between the HDI sensor 123 (the head 12 comprising the HDI sensor 123) and the disk 11, for example, thermal interference. That is, the HDI sensor 123 applied in the embodiment is a type of thermal sensor.

The HDI sensor 123 comprises, for example, a magnetoresistive (MR) element (not shown in the drawings). The MR element is known to have a resistance value varying significantly depending on temperature. The temperature of the HDI sensor 123 varies depending on the magnitude of thermal interference (that is, thermal interaction) between the HDI sensor 123 and the disk 11. For example, when the head 12 comes into contact with a media bump present on a surface of the disk 11, heat is generated between the head 12 (the HDI sensor 123 in the head 12) and the disk 11. Then, the temperature of the HDI sensor 123 changes.

The resistance value of the HDI sensor 123 (more specifically, the MR element in the HDI sensor 123) varies depending on the temperature of the HDI sensor 123. That is, the resistance value of the HDI sensor 123 represents the magnitude of thermal interference between the HDI sensor 123 and the disk 11. The magnitude of the thermal interference varies depending on the state of the surface of the disk 11 lying opposite the HDI sensor 123. That is, the resistance value of the HDI sensor 123 varies depending on the state of the surface of the disk 11 lying opposite the HDI sensor 123. Thus, the HDI sensor 123 is used to detect a defect such as a media bump on the disk 11.

The HDI sensor 123 (more specifically, the MR element in the HDI sensor 123) is wider than the read element 122 in approximately the radial direction of the disk 11 (hereinafter referred to as the disk radial direction). In general, the width of the HDI sensor 123 in the disk radial direction is more than a dozen times as large as the width of the read element 122.

The driver IC 15 drives the SPM 13 and the VCM 143 under the control of the controller 20 (more specifically, the servo controller 23 in the controller 20). The head IC 16 is also referred to as a head amplifier (preamplifier). The head IC 16 is fixed, for example, to a predetermined location on the actuator 14 (more specifically, the arm 140 of the actuator 14) and electrically connected to the controller 20 via a flexible printed circuit board (FPC). However, in FIG. 1, the head IC 16 is disposed away from the actuator 140, for convenience of drawing.

The head IC 16 amplifies a signal read by the read element 122 in the head 12 (that is, a read signal). The head IC 16 also converts write data output by the controller 20 (more specifically, an R/W channel 21 in the controller 20 which will be described later) into a write current and outputs the write current to the write element 121 in the head 12.

The head IC 16 includes a sensor voltage detector 160. The sensor voltage detector 160 supplies a predetermined bias current to the MR element of the HDI sensor 123 in the head 12 and thus detects (that is, monitors) a voltage V_HDIS across the MR element. The voltage V_HDIS is referred to as an HDI sensor voltage. The HDI sensor voltage V_HDIS varies depending on the resistance value ρ of the MR element (that is, the temperature of the MR element). Thus, the HDIS sensor voltage V_HDIS represents the magnitude of the thermal interference between the HDI sensor 123 and the disk 11. The head IC 16 detects the average level (average voltage) AV_HDIS of the HDI sensor voltage in units of servo frames 111 (more specifically, in units of data areas 113 in the servo frames 111) in accordance with a servo timing signal described later.

The controller 20 is implemented by a system LSI comprising a plurality of elements integrated together on a single chip. The controller 20 comprises a read/write (R/W) channel 21, a hard disk controller (HDC) 22, a servo controller 23, a main controller 24, and a flash ROM (FROM) 25.

The R/W channel 21 processes signals associated with read/write. That is, the R/W channel 21 converts a read signal amplified by the head IC 16 into digital data and decodes read data from the digital data. The R/W channel 21 also extracts servo data from the digital data. The R/W channel 21 also generates a servo timing signal based on the extracted servo data. The servo timing signal corresponds to the servo frame 111 including the servo area 112 (more specifically, the data area 113 in the servo frame 111 including the servo area 112) in which the extracted servo data is recorded. The R/W channel 21 also codes write data transferred by the HDC 22 and transfers the coded write data to the head IC 16.

The HDC 22 is connected to a host device (hereinafter referred to as a host) via a host interface (storage interface) HIF. The host utilizes the magnetic disk drive shown in FIG. 1 as its own storage device. The host and the magnetic disk drive shown in FIG. 1 are provided in electronic device such as a personal computer, a video camera, a music player, a mobile terminal, a cellular phone, or a printer device. The HDC 22 functions as a host interface controller which transfers signals to the host and which receives signals transferred by the host. Specifically, the HDC 22 receives commands (a write command, a read command, and the like) transferred by the host. The HDC 22 also controls data transfers between the host and the HDC 22. The HDC 22 also functions as a disk interface controller that controls data writes to and data reads from the disk 11 via the R/W channel 21, the head IC 16, and the head 12

The HDC 22 includes a first defect detector 221, a second defect detector 222, and a RAM 223. The RAM 223 is a volatile memory. At least a part of a storage area in the RAM 223 is used as a work area for the HDC 22.

The first defect detector 221 scans the recording surface of the disk 11 using the head 12 and thus detects a defect on the recording surface using the HDI sensor 123 of the head 12. Scan for detecting a defect using the HDI sensor is referred to as HDI sensor scan. Furthermore, defect detection using HDI sensor scan is referred to as a first scan test.

More specifically, the first defect detector 221 compares the average level AV_HDIS detected by the head IC 16 for every servo frame 111 (that is, the average level AV_HDIS of the HDI sensor voltage V_HDIS) with a first reference level. Based on the comparison, the HDC 22 determines a servo frame for which the average level AV_HDIS is higher than the first reference level to be a defect. In this case, the first defect detector 221 determines that all the data sectors in the servo frame determined to be a defect (that is, the defect servo frame) are defects (that is, defect data sectors). The first defect detector 221 further determines the track (cylinder) 100 containing the defect servo frame to be a defect (that is, a defect track or a defect cylinder).

Upon determining (detecting) the defect cylinder, the first defect detector 221 determines the cylinder number of a cylinder where the read element 122 is positioned to be the cylinder number of the defect cylinder. That is, the first defect detector 221 determines the cylinder number extracted by the R/W channel 21 from the servo data read by the read element 122 to be the cylinder number of the defect cylinder. Thus, the determined cylinder number does not necessarily match the cylinder number of the cylinder where the center of the HDI sensor 123 is positioned (that is, the defect cylinder).

The first defect detector 221 executes the above-described determination (that is, the defect detection) on all the servo frames in all the tracks on the disk.

The second defect detector 222 scans the recording surface of the disk 11 using the head 12 and thus detects a defect on the recording surface using the read element 122 of the head 12. That is, the second defect detector 222 allows the read element 122 to read test data (more specifically, a data signal with a single frequency) written all over the recording surface of the disk 11 and detects a defect based on the level of the read data signal (that is, the read signal).

Scan for defect detection using the read element 122 is referred to as defect scan. Furthermore, defect detection using defect scan is referred to as a second scan test.

The frequency of the data signal corresponds to the length of a bit in the disk circumferential direction (more specifically, the circumferential direction of the disk 11). The bit is the minimum unit for data recording. The head IC 16 amplifies the read signal and outputs the amplified read signal to the R/W channel 21. The second defect detector 222 compares the level of the read signal detected by the R/W channel 21 (that is, the read signal amplified by the head IC 16) with a second reference level, for example, in units of bits. Based on the comparison, the second defect detector 222 determines a bit for which the level of the read signal is lower than the second reference level to be an error (what is called a missing pulse error). The second defect detector 222 determines a data sector for which the number of error bits is larger than a reference value to be a defect (that is, a defect data sector). The second defect detector 222 further determines the track (cylinder) 100 containing the defect data sector to be a defect (that is, a defect track or a defect cylinder). The second defect detector 222 executes such a determination (that is, defect detection) on all the data sectors in all the tracks on the disk 11.

The head IC 16 may function as a part of the first defect detector 221 and compare the average level AV_HDIS with the first reference level. Alternatively, the R/W channel 21 may function as a part of the first defect detector 221 and compare the average level AV_HDIS with the first reference level. Furthermore, the R/W channel 21 may detect the average level AV_HDIS. That is, the first defect detector 221 may be distributed among the head IC 16, the R/W channel 21, and the HDC 22 or between the R/W channel 21 and the HDC 22.

The servo controller 23 controls the SPM 13 and the VCM 143 via the driver IC 15. In particular, the servo controller 23 controls the VCM 143 based on servo data extracted by the R/W channel 21 in order to place the head 12 at a target position in the target track 110 on the disk 11. In this case, controlling the VCM 143 is equivalent to controlling the actuator 14 with the VCM 143.

The main controller 24 controls the whole magnetic disk drive shown in FIG. 1. The main controller 24 includes a track slip processor 240. The track slip processor 240 executes a first track slip process and a second track slip process.

The first track slip process refers to a process of recording an area corresponding to a defect on the disk 11 detected using the first defect detector 221 in a track slip management table 114b (see FIG. 2) described later, as a track slip area. The track slip area refers to a defect area on which no write/read operation is to be performed. The second track slip process refers to a process of recording an area corresponding to a defect on the disk 11 detected using the second defect detector 222 in the track slip management table 114b as a track slip area.

According to the embodiment, the main controller 24 is implemented using a CPU. That is, the CPU implements the functions of the main controller 24 by executing a control program. The control program is pre-stored in the FROM 25. The FROM 25 is a rewritable nonvolatile memory.

FIG. 2 is a conceptual drawing showing an exemplary format of the recording surface of the disk 11 shown in FIG. 1. The recording surface of the disk 11 is partitioned into a system area 114 and a user area 115 in the radial direction of the disk 11. That is, the recording surface of the disk 11 comprises the system area 114 and the user area 115. The system area 114 is a storage area used by the system, that is, a storage area not recognized by the user. The system area 114 is a non-user area with respect to the user area 115. The user area 115 is a storage area that can be used by a user, that is, a storage area recognized by the user. According to the embodiment, the system area 114 is secured on an outer circumferential side of the disk. However, the system area 114 may be secured on a middle circumferential side or an inner circumferential side.

A part (first area) of the system area 114 is used to store a defect management table 114a. The defect management table 114a is used to record therein defect position information indicative of locations, on the disk 11, of defects detected by the first defect detector 221 and the second defect detector 222.

Another part (second area) of the system area 114 is used to store the track slip management table 114b. The track slip management table 114b is used to record therein a track slip area determined by the track slip processor 240 (more specifically, track slip management information indicative of the track slip area).

FIG. 3 is a block diagram showing an exemplary configuration of the track slip processor 240 shown in FIG. 1. The track slip processor 240 comprises a track slip controller 241, a yaw angle calculator 242, a correction value calculator 243, a detected position compensator 244, a track slip area determination module 245, a shift amount calculator 246, and a position difference calculator 247.

The track slip controller 241 controls the other elements in the track slip processor 240 for the first and second track slip processes. The yaw angle calculator 242 calculates, during the first track slip process, the yaw angle θ of the head 12 based on the radial position of the read element 122 on the disk 11. The yaw angle θ of the head 12 refers to the angle between the head 12 and a tangent to the circumference at the radial position of the read element 122 on the disk 11. The calculation of the yaw angle θ will be described in detail later.

The correction value calculator 243 calculates a correction value CVncyl based on a position difference PDIF and the yaw angle θ. The position difference PDIF refers to the distance (that is, difference) between the position (central position) of the read element 122 and the position (central position) of the HDI sensor 123. The correction value CVncyl is used to correct a shift of the position of a defect detected using the HDI sensor 123 (that is, a shift of the detected position).

The correction value CVncyl represents the amount of shift of the detected position in terms of the number of cylinders. The shift of the detected position occurs when the location on the disk 11 where the read element 122 is positioned is used as the position of a defect detected using the HDI sensor 123. That is, the shift of the detected position results from the difference in position (position difference) between the HDI sensor 123 used to detect a defect and the read element 122 used to detect the position of the defect. The calculation of the correction value CVncyl will be described in detail later.

The detected position compensator 244 corrects the shift of the detected position based on the correction value CVncyl. The track slip area determination module 245 determines a track slip area based on the corrected detected position. The shift amount calculator 246 and the position difference calculator 247 are not necessarily needed for the embodiment. Thus, the shift amount calculator 246 and the position difference calculator 247 will be described later in a modification of the embodiment.

Figure 4A:
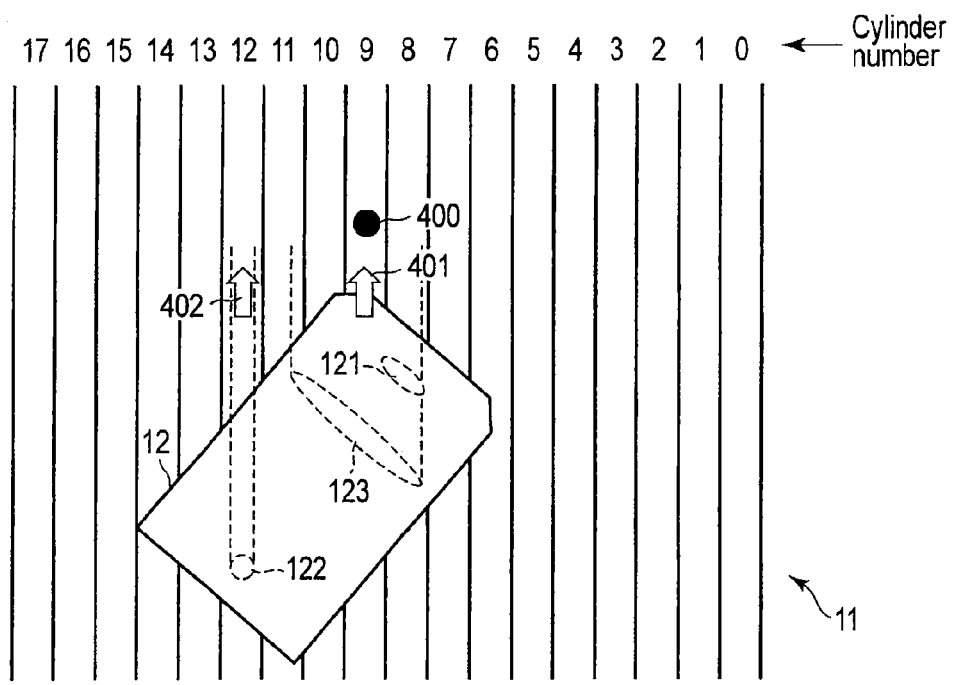
FIG. 4A is a diagram showing an example of arrangement of a write element, a read element, and a head disk interference (HDI) sensor in a head, and an example of the relation between the actual position of a defect detected by HDI sensor scan and the position of the read element at the time of the detection.

FIG. 4A is a diagram showing an example of arrangement of the write element 121, the read element 122, and the HDI sensor 123 in the head 12, and an example of the relation between the actual position of a defect 400 detected by HDI sensor scan and the position of the read element 122 at the time of the detection. FIG. 4B is a diagram showing an example of arrangement of the write element 121, the read element 122, and the HDI sensor 123 in the head 12, and an example of the relation between the actual position of the defect 400 detected by defect scan and the position of the read element 122 at the time of the detection. In FIG. 4A and FIG. 4B, a cylinder with a cylinder number 0 (that is, the cylinder 0) is the outermost cylinder on the disk 11. In the example in FIG. 4A and FIG. 4B, a defect 400 is present in a cylinder on the disk 11 having a cylinder number 9 (that is, a cylinder 9). The defect 400 is a media bump.

In the example in FIG. 4A, the center of the HDI sensor 123 is positioned on the cylinder (track) 9 in which the defect 400 is present as shown by arrow 401. However, due to a difference in position between the read element 122 and the HDI sensor 123, the read element 122 is positioned on a cylinder with a cylinder number 12 (that is, a cylinder 12) as shown in arrow 402. That is, the location where the read element 122 is positioned is different from the actual location of the defect 400.

When the HDI sensor 123 is used to detect the defect 400, the position of the defect 400 is detected based on the cylinder number included in the servo data read by the read element 122. In the example in FIG. 4A, the cylinder 12 is detected as the position of the defect 400. The detected position (cylinder 12) is away from the actual position (cylinder 9) of the defect 400.

Figure 4B:
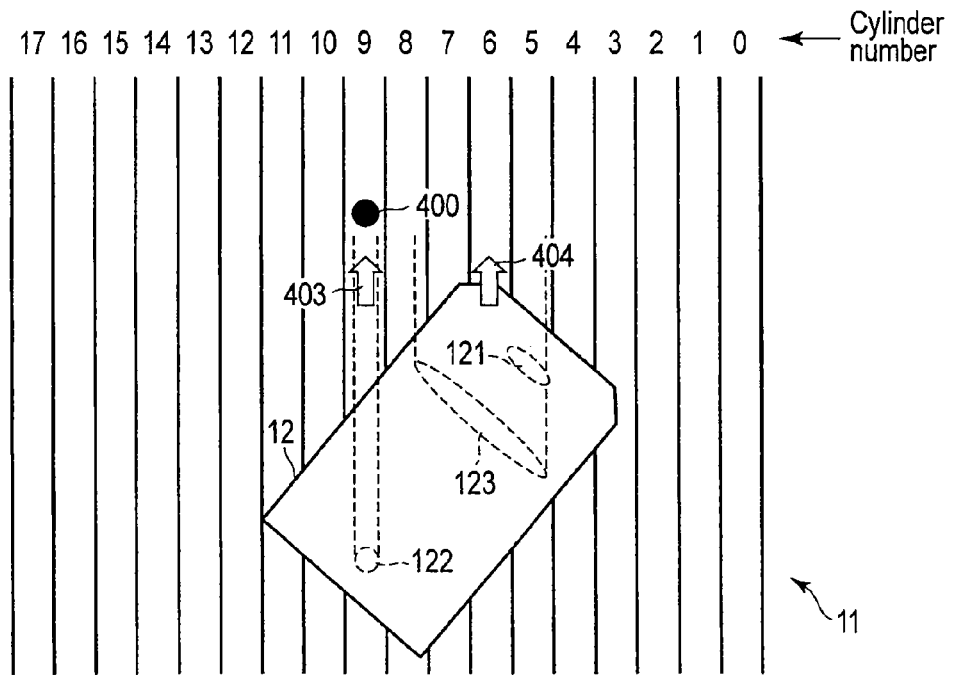
FIG. 4B is a diagram showing an example of arrangement of the write element, the read element, and the HDI sensor in the head, and an example of the relation between the actual position of the defect detected by defect scan and the position of the read element at the time of the detection.

On the other hand, in the example in FIG. 4B, the read element 122 is positioned on the cylinder 9 in which the defect 400 is present as shown by arrow 403. In this case, the center of the HDI sensor 123 is positioned on a cylinder with a cylinder number 6 (that is, a cylinder 6) as shown by arrow 404. With defect scan, when the read element 122 fails to read data (test data) normally, the location where the read element 122 is positioned is detected as the location of the defect.

Thus, in the example in FIG. 4B, the detected position (cylinder 9) coincides with the actual position of the defect 400. However, when the defect 400 is a media bump, the defect 400 is not necessarily detected by defect scan.

Figure 5:
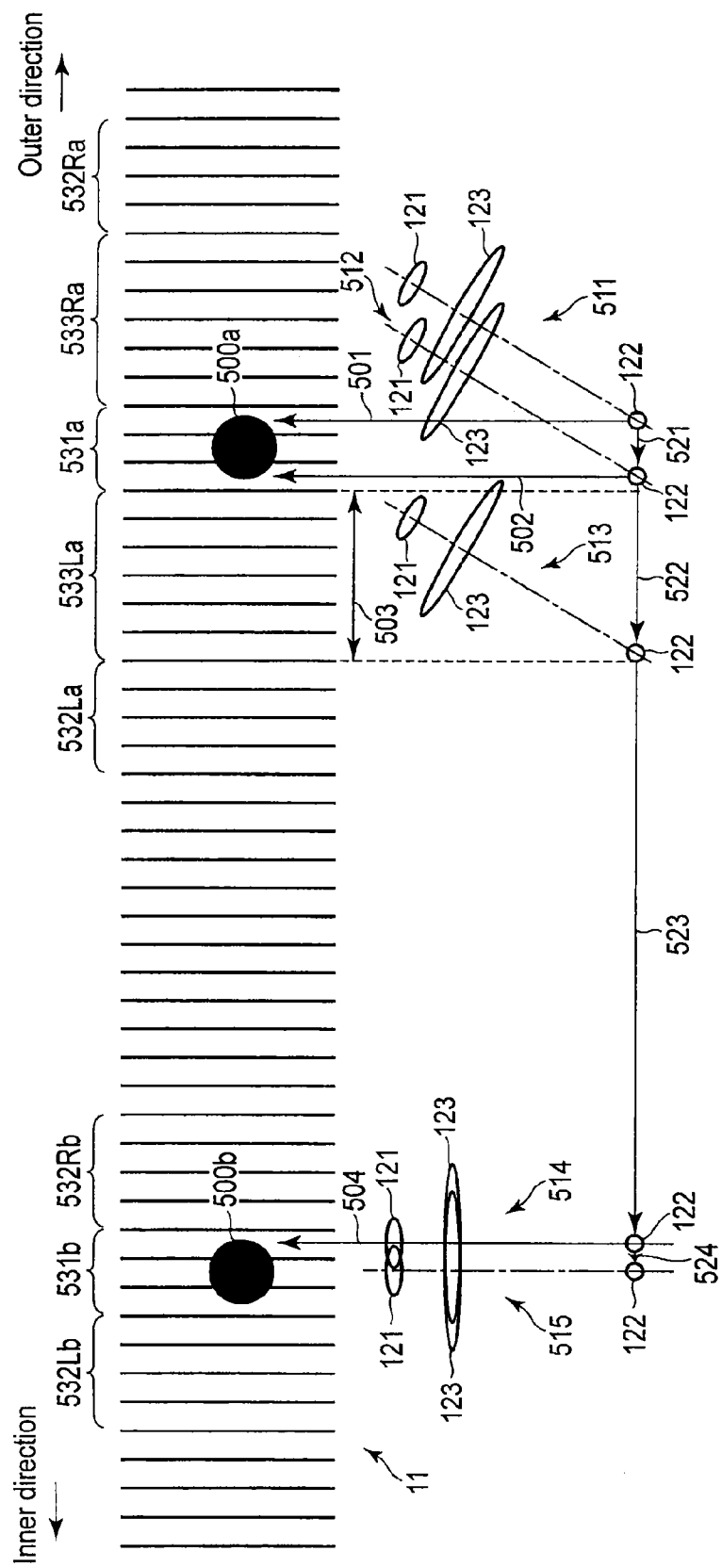
FIG. 5 is a diagram illustrating the yaw angle dependence of a track slip area determined based on defect scan.

FIG. 5 is a diagram illustrating the yaw angle dependence of a track slip area determined based on a defect scan. In FIG. 5, vertical stripes on the disk 11 show some of the cylinders. In the example in FIG. 5, a defect 500a and a defect 500b like media bumps are present at different radial positions on the disk 11. In this case, the defect 500b is present in a more inner direction than the defect 500a on the disk 11. Furthermore, in the example in FIG. 5, the head 12 is assumed to moves (scans) from the outer circumferential side to the inner circumferential side of the disk 11. However, FIG. 5 shows the write element 121, read element 122, and HDI sensor 123 mounted in the head 12, but does not show the entire head 12. Furthermore, the centers of the write element 121, the read element 122, and the HDI sensor 123 are in the same straight line. According to the embodiment, this straight line coincides with the centerline of the arm 140 of the actuator 141.

In FIG. 5, a state 511 indicates that the read element 122 is located at the radial position (cylinder position) of one end (outer circumferential side end) of the defect 500a on the disk 11 as shown by arrow 501. A state 512 indicates that the head 12 in the state 511 has been moved by a distance corresponding to a length shown by arrow 521 in a direction shown by arrow 521 (the inner direction of the disk 11). In the state 512, the read element 122 is located at the radial position (cylinder position) of the other end (inner circumferential side end) of the defect 500a on the disk 11 as shown by arrow 502. In this case, a range 531a of three consecutive cylinders corresponding to the range of movement of the read element 122 is detected as the location of the defect 500a. Thus, the range 531a is referred as a detected location 531a of the defect 500a.

In the example in FIG. 5, when the head 12 is positioned near the defect 500a as in the case of the states 511 and 512, the head 12 has a large yaw angle θ. Such a large yaw angle θ significantly shifts the radial position of the write element 121 on the disk 11 from the radial position of the read element 122 on the disk 11.

In FIG. 5, a state 513 indicates that the head 12 in the state 512 has been moved by a distance corresponding to a length shown by arrow 522 in a direction shown by arrow 522. In the state 513, the amount 503 of shift between the cylinder position of the write element 121 and the cylinder position of the read element 122 (that is, the amount 503 of shift depending on the yaw angle) is 6 cylinders.

When the defect 500a is detected by defect scan, an area including the detected location 531a and a peripheral portion thereof is determined to be a track slip area. The peripheral portion of the detected location 531a comprises an inner circumferential side peripheral portion and an outer circumferential side peripheral portion. The inner circumferential side peripheral portion is in contact with the detected location 531a on the inner circumferential side of the disk 11 and includes a first extended area 532La and a second extended area 533La. The outer circumferential side peripheral portion is in contact with the detected location 531a on the outer circumferential side of the disk 11 and includes a first extended area 532Ra and a second extended area 533Ra. Each of the first extended areas 532La and 532Ra is a margin set to avoid a possible collision between the head 12 and a defect (media bump) and includes a predetermined number of cylinders. Each of the second extended areas 533La and 533Ra includes cylinders the number of which corresponds to the amount 503 of shift depending on the yaw angle θ of the head 12 at the detected location 531a and the difference in position between the write element 121 and the read element 122 (more specifically, the distance between the write element 121 and the read element 122). That is, the second extended areas 533La and 533Ra are set to avoid positioning the write element 121 and the read element 122 within the cylinder range in which the defect (media bump) is present.

In FIG. 5, a state 514 indicates that the head 12 in the state 513 has been moved by a distance corresponding to a length shown by arrow 523 in a direction shown by arrow 523. In the state 514, the read element 122 is positioned at one end (outer circumferential side end) of the defect 500b as shown by arrow 504. A state 515 indicates that the head 12 in the state 514 has been moved by a distance corresponding to a length shown by arrow 524 in a direction shown by arrow 524. In the state 515, the read element 122 is positioned at the radial position of the center of the defect 500b on the disk 11. In the state 514 and the state 515, the amount of shift between the cylinder position of the write element 121 and the cylinder position of the read element 122 is approximately zero. That is, when the head 12 is positioned near the defect 500b, the yaw angle θ of the head 12 is approximately zero. In this state, the amount of shift between the cylinder position of the write element 121 and the cylinder position of the read element 122 is approximately zero.

When the defect 500b is detected by defect scan, an area including a detected location 531b and a peripheral portion thereof (that is, an inner circumferential side peripheral portion and an outer circumferential side peripheral portion) is determined to be a track slip area. The inner circumferential side peripheral portion of the detected location 531b includes a first extended area 532Lb corresponding to the first extended area 532La. The outer circumferential side peripheral portion of the detected location 531b includes a first extended area 532Rb corresponding to the first extended area 532Ra. The number of cylinders included in each of the first extended areas 532Lb and 532Rb is equal to the number of cylinders included in each of the first extended areas 532La and 532Ra.

The inner circumferential side peripheral portion and outer circumferential side peripheral portion of the detected location 531b do not include second extended areas corresponding to the second extended areas 533La and 533Ra. This is because when the head 12 is positioned near the defect 500b, the yaw angle 8 of the head 12 is approximately zero. That is, when the head 12 is positioned near the defect 500b, the amount of shift between the cylinder position of the write element 121 and the cylinder position of the read element 122 is approximately zero.

Figure 6:
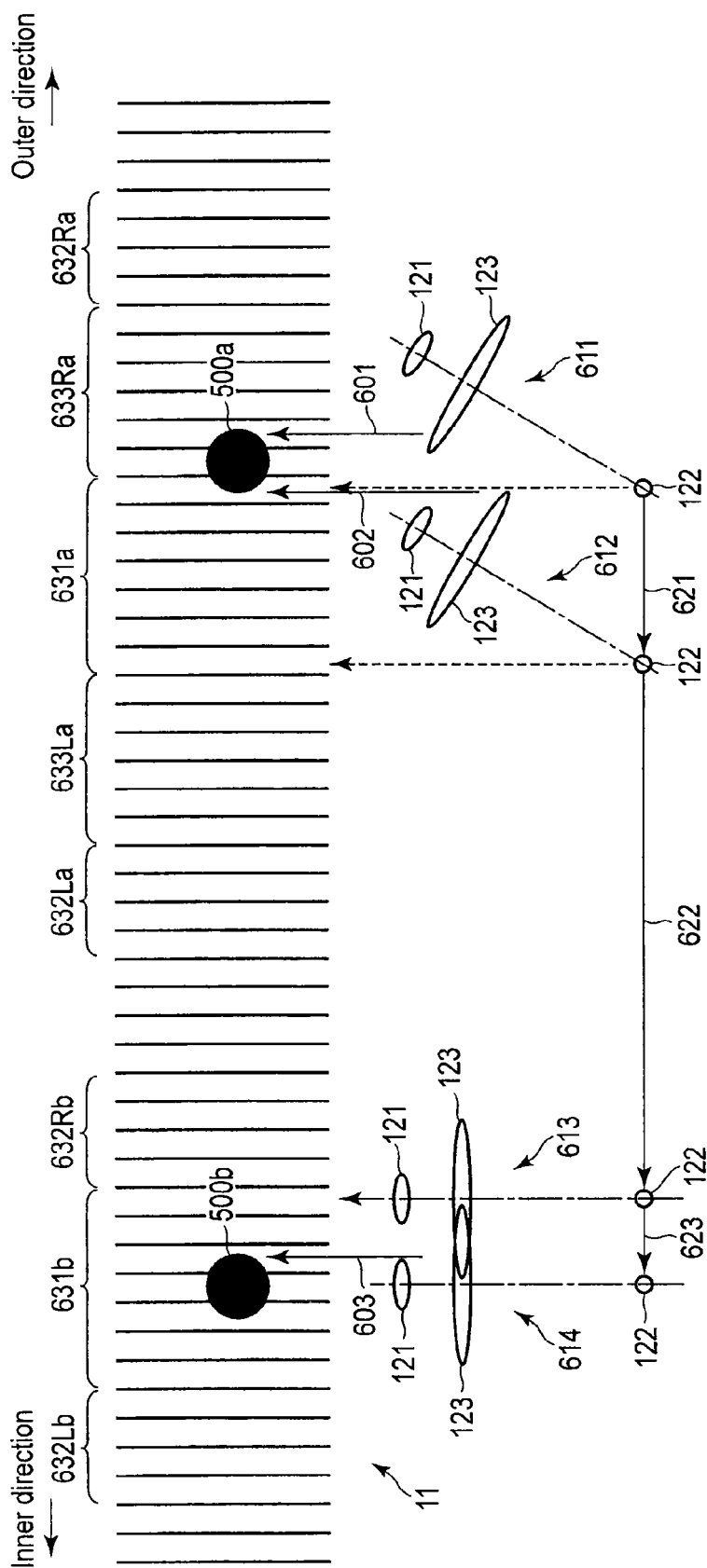
FIG. 6 is a diagram illustrating the yaw angle dependence of a track slip area which is observed when the track slip area is assumed to be determined based on HDI sensor scan.

FIG. 6 is a diagram illustrating the yaw angle dependence of a track slip area which is observed when the track slip area is assumed to be determined based on HDI sensor scan. Also in the example in FIG. 6, the defects 500a and 500b are present at different radial positions on the disk 11, as is the case with the example in FIG. 5.

In FIG. 6, a state 611 indicates that one end (inner circumferential side end) of the HDI sensor 123 is positioned at the radial position of one end (outer circumferential side end) of the defect 500a on the disk 11. In the state 611, the position of the read element 122 is away from the radial position of the one end (outer circumferential side end) of the defect 500a on the disk 11.

A state 612 indicates that the head 12 in the state 611 has been moved by a distance corresponding to a length shown by arrow 621 in a direction shown by arrow 621. In the state 612, the other end (outer circumferential side end) of the HDI sensor 123 is positioned at the radial position of the other end (inner circumferential side end) of the defect 500*a* on the disk 11 as shown by arrow 602. On the other hand, the read element 122 is positioned at a radial position on the disk 11 significantly away from the defect 500*a*. In this case, a range 631*a* of seven consecutive cylinders corresponding to the range of movement of the read element 122 is detected as the location of the defect 500*a*. Thus, the range 631*a* is referred as a detected location (first detected location) 631*a* of the defect 500*a*. As is apparent from FIG. 6, the detected location 631*a* is significantly away from the actual location of the defect 500*a* in the radial direction of the disk 11 (hereinafter referred to as the disk radial direction). This shift depends on the yaw angle θ of the head 12.

When the defect 500*a* is detected by HDI sensor scan, an area including the detected location 631*a* and a peripheral portion thereof is determined to be a track slip area. In this case, it is assumed that the detected location 631*a* is not corrected to the actual location of the defect 500*a* (that is, the location corresponding to the detected location 531*a* shown in FIG. 5). Then, an inner circumferential side peripheral portion of the detected position 631*a* includes a first extended area 632La and a second extended area 633La. An outer circumferential side peripheral portion of the detected position 631*a* includes a first extended area 632Ra and a second extended area 633Ra. Each of the first extended area 632La and 632Ra includes a predetermined number of cylinders. The number of cylinders included in each of the first extended area 632La and 632Ra is equal to the number of cylinders included in each of the first extended areas 532La, 532Ra, 532Lb, and 532Rb shown in FIG. 5. Each of the second extended areas 633La and 633Ra includes cylinders the number of which corresponds to the amount of shift depending on the yaw angle θ of the head 12 at the detected location 631*a*.

In FIG. 6, a state 613 indicates that the head 12 in the state 612 has been moved by a distance corresponding to a length shown by arrow 622 in a direction shown by arrow 622. In the state 613, one end (inner circumferential side end) of the HDI sensor 123 is positioned on one end (outer circumferential side end) of the defect 500*b* as shown by arrow 603. A state 614 indicates that the head 12 in the state 613 has been moved by a distance corresponding to a length shown by arrow 623 in a direction shown by arrow 623. In the state 614, the read element 122 is positioned at the radial position of the center of the defect 500*b* on the disk 11. In the state 614, the amount of shift between the cylinder position of the write element 121 and the cylinder position of the read element 122 is approximately zero. That is, when the head 12 is positioned near the defect 500*b*, the yaw angle θ of the head 12 is approximately zero, and in this state, the amount of shift between the cylinder position of the write element 121 and the cylinder position of the read element 122 is approximately zero. In this case, the detected location 631*b* of the defect 500*b* is prevented from being shifted from the actual location of the defect 500*b*, as shown in FIG. 6.

When the defect 500*b* is detected by HDI sensor scan, an area including the detected location 631*b* and a peripheral portion thereof (that is, an inner circumferential side peripheral portion and an outer circumferential side peripheral portion) is determined to be a track slip area. The inner circumferential side peripheral portion of the detected location 631*b* includes a first extended area 632Lb corresponding to the first extended area 632La. The outer circumferential side peripheral portion of the detected location 631*b* includes a first extended area 632Rb corresponding to the first extended area 632Ra.

As described above, in the example in FIG. 6, the detected location 631*a* is significantly away from the actual location of the defect 500*a* in the disk radial direction. Thus, given that the detected location 631*a* is not corrected to the actual location of the defect 500*a*, avoiding a possible collision of the head 12 against the defect 500*a* is difficult even when the track slip area includes the inner circumferential side peripheral portion (first extended area 632La and second extended area 633La) and the outer circumferential side peripheral portion (first extended area 632Ra and second extended area 633Ra) of the detected location 631*a*. Reliable avoidance of the collision needs securement of second extended areas 633La and 633Ra including more cylinders than necessary.

Figure 7:
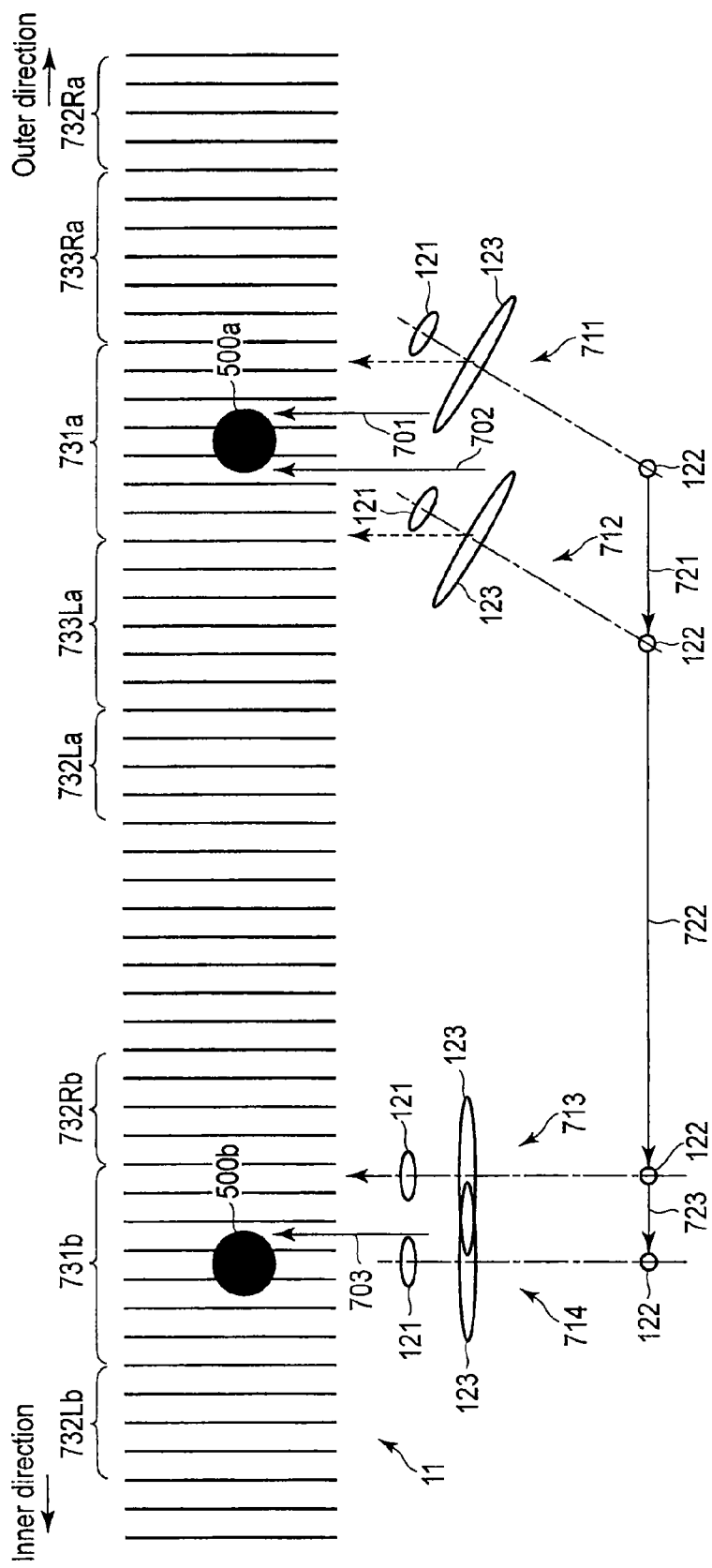
FIG. 7 is a diagram illustrating the yaw angle dependence of a track slip area determined by correcting the location of a defect detected based on HDI sensor scan according to the embodiment.

Thus, the embodiment is characterized by correcting the shift of the detected location 631*a* from the actual location of the defect 500*a*. FIG. 7 is a diagram illustrating the yaw angle dependence of a track slip area determined by correcting the location of a defect detected based on HDI sensor scan according to the embodiment. Also in the example in FIG. 7, the defects 500*a* and 500*b* are assumed to be present at different radial positions on the disk 11, as is the case with the examples in FIG. 5 and FIG. 6.

In FIG. 7, a state 711 indicates that one end (inner circumferential side end) of the HDI sensor 123 is positioned at the radial position of one end (outer circumferential side end) of the defect 500*a* on the disk 11 as shown by arrow 701. In the state 711, the position of the read element 122 is away from the radial position of the one end (outer circumferential side end) of the defect 500*a* on the disk 11. According to the embodiment, the position of the read element 122 is corrected to the radial position (cylinder position) of the center of the HDI sensor 123 on the disk 11.

A state 712 indicates that the head 12 in the state 711 has been moved by a distance corresponding to a length shown by arrow 721 in a direction shown by arrow 721. In the state 712, the other end (outer circumferential side end) of the HDI sensor 123 is positioned at the radial position of the other end (inner circumferential side end) of the defect 500*a* on the disk 11 as shown by arrow 702. On the other hand, the read element 122 is positioned at a radial position on the disk 11 significantly away from the defect 500*a*. According to the embodiment, the position of the read element 122 is corrected to the radial position (cylinder position) of the center of the HDI sensor 123 on the disk 11.

Hence, according to the embodiment, a range 731*a* of movement of the center of the HDI sensor 123 (that is, the range of seven consecutive cylinders) corresponding to the range of movement of the read element 122 is detected as the location of the defect 500*a*. Thus, the range 731*a* is referred as a detected location (second detected location) 731*a* of the defect 500*a*.

According to the embodiment, when the defect 500*a* is detected by HDI sensor scan, an area including the detected location 731*a* and a peripheral portion thereof is determined to be a track slip area. An inner circumferential side peripheral portion of the detected location 731*a* includes a first extended area 732La and a second extended area 733La. An outer circumferential side peripheral portion of the detected location 731*a* includes a first extended area 732Ra and a second extended area 733Ra. Each of the first extended areas 732La and 732Ra includes a predetermined number of cylinders. The number of cylinders included in each of the first extended area 732La and 732Ra is equal to the number of cylinders included in each of the first extended areas 632La, 632Ra, 632Lb, and 632Rb shown in FIG. 6. Each of the second extended areas 733La and 733Ra includes cylinders the number of which corresponds to the amount of shift depending on the yaw angle θ of the head 12 at the detected location 731*a*.

In FIG. 7, a state 713 indicates that the head 12 in the state 712 has been moved by a distance corresponding to a length shown by arrow 722 in a direction shown by arrow 722. In the state 713, one end (inner circumferential side end) of the HDI sensor 123 is positioned on one end (outer circumferential side end) of the defect 500b as shown by arrow 703. A state 714 indicates that the head 12 in the state 713 has been moved by a distance corresponding to a length shown by arrow 723 in a direction shown by arrow 723. In the state 714, the read element 122 is positioned at the radial position of the center of the defect 500b on the disk 11. In the state 714, the amount of shift between the cylinder position of the write element 121 and the cylinder position of the read element 122 is approximately zero. That is, when the head 12 is positioned near the defect 500b, the yaw angle θ of the head 12 is approximately zero, and in this state, the amount of shift between the cylinder position of the write element 121 and the cylinder position of the read element 122 is approximately zero. Also in this case, the embodiment corrects the position of the read element 122 to the radial position (cylinder position) of the center of the HDI sensor 123 on the disk 11. That is, the location of the defect 500b detected by the read element 122 is corrected as follows.

First, when one end (inner circumferential side end) of the HDI sensor 123 is positioned on one end (outer circumferential side end) of the defect 500b, a cylinder in which the center of the HDI sensor 123 is positioned is referred to as a cylinder X. Then, when the other end (outer circumferential side end) of the HDI sensor 123 is positioned on the other end (inner circumferential side end) of the defect 500b, a cylinder in which the center of the HDI sensor 123 is positioned is referred to as a cylinder Y. In this case, the location of the defect 500b detected by the read element 122 is corrected to a range from the cylinder X to the cylinder Y. The corrected range is used as the detected location 731b of the defect 500b. An area including the detected location 731b and a peripheral portion thereof (that is, an inner circumferential side peripheral portion and an outer circumferential side peripheral portion) is determined to be a track slip area. The inner circumferential side peripheral portion of the detected location 731b includes a first extended area 732Lb corresponding to the first extended area 732La. The outer circumferential side peripheral portion of the detected location 731b includes a first extended area 732Rb corresponding to the first extended area 732Ra.

Figure 8:
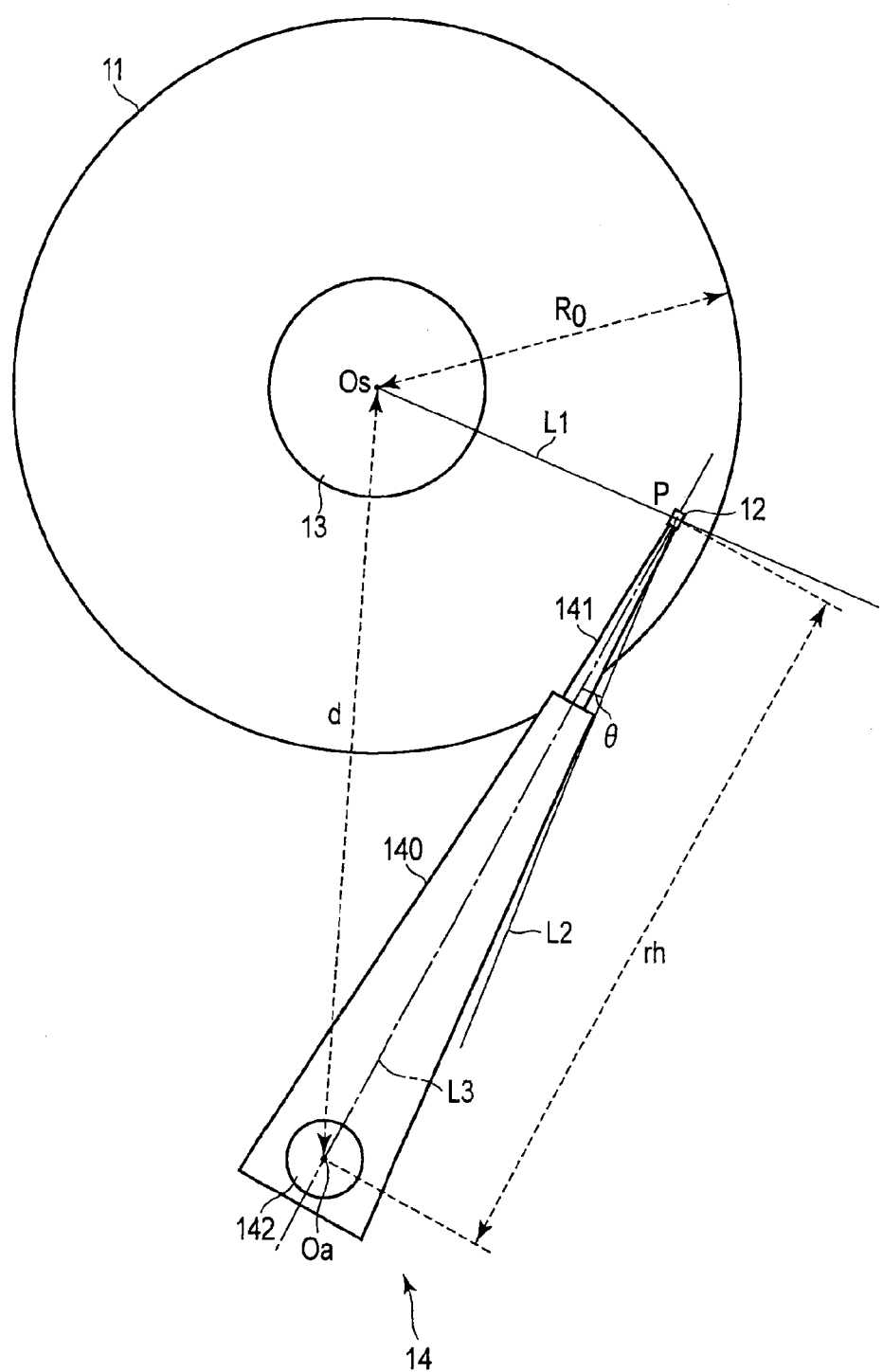
FIG. 8 is a diagram illustrating the yaw angle of the head according to the embodiment.

Now, the calculation of the yaw angle θ of the head 12 applied in the embodiment will be described with reference to FIG. 8. FIG. 8 is a diagram illustrating the yaw angle 6 of the head 12. In FIG. 8, L1 denotes a segment passing through the center Os of the SPM 13 (that is, the center Os of the disk) and the position P of the head 12 (more specifically, the position P of the read element 122). L2 denotes a segment (that is, a tangent) contacting, at the point P, a circumference on the disk 11 passing through the position P. That is, the tangent L2 is a segment passing through the position P and crossing the segment L1 at right angles. L3 denotes a segment passing through the center Oa of the pivot 142 of the actuator 14 and the position of the head 12 (read element 122). In the embodiment, the segment L3 coincides with the centerline of the arm 140 of the actuator 14.

The yaw angle θ of the head 12 is the angle between the tangent L2 and the segment L3, that is, the angle between the segment L2 and the head 12. The distance between the center Os of the SPM 13 and the center Oa of the pivot 142 of the actuator 14 is denoted by d. The turning radius of the head 12 (that is, the distance between the center Oa of the pivot 142 of the actuator 14 and the position P of the read element 122 in the head 12) is denoted by rh. The radial position of the outermost cylinder on the disk 11 (in this case, a cylinder with a cylinder number 0, that is, a cylinder 0) is denoted by $R_0$. The cylinder number of a cylinder in which the head 12 (read element 122) is positioned is denoted by CN. Furthermore, the interval between the cylinders (tracks) on the disk 11, that is, a track pitch, is denoted by TP.

In this case, the yaw angle calculator 242 calculates the yaw angle θ of the head 12 in accordance with:

$$\theta = \mathrm{ArcCos}((d^2 + rh^2 + (R_0 - CN \times TP)^2)/(2 \times d \times rh)) \times 180/\pi \quad (1)$$

According to the embodiment, the track pitch TP is not changed. In this case, the only variable on the right-hand side is the cylinder number CN. That is, the right-hand side in Equation (1) is a function using the cylinder number CN as a variable. Thus, Equation (1) indicates that the yaw angle θ of the head 12 is calculated based on the cylinder number CN. Equation (1) also indicates that the yaw angle θ of the head 12 varies depending on the cylinder position of the head 12 (read element 122) on the disk 11 (that is, a disk radius position).

Based on the position difference PDIF and the yaw angle θ, the correction value calculator 243 calculates the correction value CVncyl in accordance with:

$$CV n cyl = PDIF \times \sin \theta / TP \quad (2)$$

Figure 9:
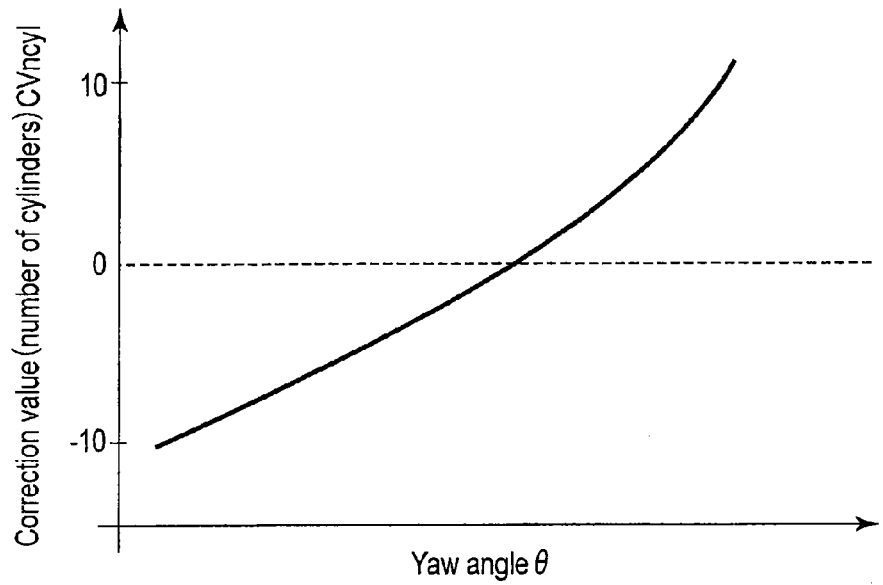
FIG. 9 is a diagram showing an example of the relation between the yaw angle and a correction value according to the embodiment.

FIG. 9 shows an example of the relation between the yaw angle θ and the correction value CVncyl. As is apparent from Equation (2), the correction value CVncyl is expressed in terms of the number of cylinders.

As described above, the yaw angle θ is calculated based on the cylinder number CN. Thus, the correction value calculator 243 may calculate the correction value CVncyl based on the position difference PDIF and the cylinder number CN (that is, the position of the read element 122). The embodiment uses a design value for the position difference PDIF. The design value (position difference PDIF) is preset in the control program stored in the FROM 25. However, instead of the design value, a calculated position difference PDIF may be used as is the case with a modification described later.

Here, CN1 denotes the cylinder number of a first cylinder (first cylinder number) in which the read element 122 is positioned when a defect (media bump) is detected using the HDI sensor 123. Furthermore, CN2 denotes the cylinder number of a second cylinder (second cylinder number) in which the HDI sensor 123 (more specifically, the center of the HDI sensor 123) is positioned when the defect (media bump) is detected.

Based on the correction value CVncyl, the detected position compensator 244 corrects the first cylinder number CN1 to the second cylinder number CN2 in accordance with:

$$CN2 = CN1 + CV n cyl \quad (3)$$

The track slip area determination module 245 determines a track slip area based on the corrected first cylinder number CN1, that is, the second cylinder number CN2, which is indicative of the corrected detected position.

Figure 10:
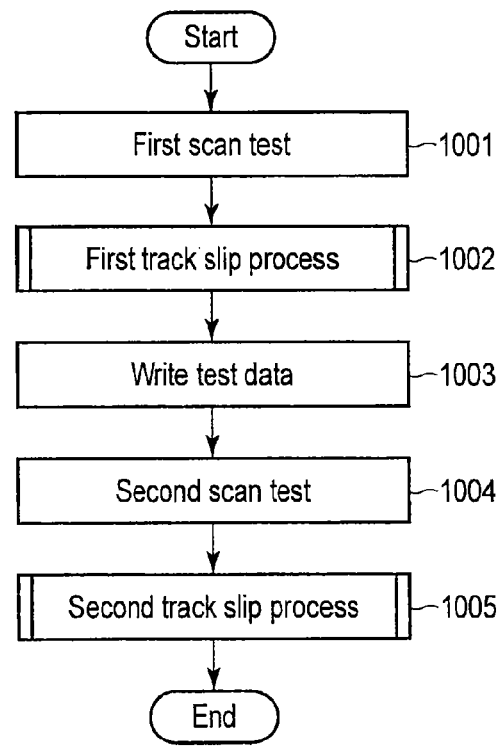
FIG. 10 is a flowchart illustrating an exemplary procedure for a defect detection and recording process according to the embodiment.

Now, a defect detection and recording process applied in the embodiment will be described with reference to FIG. 10 and FIG. 11. FIG. 10 is a flowchart illustrating an exemplary procedure for a defect detection and recording process. FIG. 11 is a flowchart illustrating an exemplary procedure for a first track slip process in the defect detection and recording process.

The defect detection and recording process refers to a process for detecting a defect on the recording surface of the disk 11 and recording a range including the detected defect as a track slip area. The embodiment executes the defect detection and recording process during a drive adjustment operation before the magnetic disk drive shown in FIG. 1 is shipped. For simplification of description, it is assumed that the defect detection and recording process is intended for the user area 115 on the recording surface of the disk 11. It is also assumed that the defect detection and recording process intended for the system area 114 has already been finished.

First, the first defect detector 221 of the HDC 22 executes a well-known scan test (that is, a first scan test) for detecting a defect on the recording surface of the disk 11 (user area 115) by HDI sensor scan (block 1001). In block 1001, the first defect detector 221, upon detecting a defect cylinder (defect track), records defect position information indicative of the defect cylinder in an entry of the defect management table 114a in the system area 114. The entry comprises a set of a cylinder number field, a first flag field, and a second flag field. The cylinder number field is used to record therein the cylinder number of the detected defect cylinder.

In block 1001, when the defect cylinder is detected by HDI sensor scan (first scan test), the first defect detector 221 acquires the cylinder number of the cylinder where the read element 122 is positioned, as the cylinder number of the defect cylinder. The first defect detector 221 records the acquired cylinder number in the cylinder number field of the entry in the defect management table 114a. The cylinder number recorded in the cylinder number field does not necessarily match the true cylinder number of the defect cylinder due to the adverse effect of the yaw angle θ of the head 12.

The first flag field is used to record therein a first flag indicative of whether the cylinder indicated by the cylinder number recorded in the corresponding cylinder number field has been detected by HDI sensor scan (first scan test) as a defect cylinder. The second flag field is used to record therein a second flag indicative of whether the cylinder indicated by the cylinder number recorded in the corresponding cylinder number field has been detected by defect scan (second scan test) as a defect cylinder. When a defect cylinder is detected in block 1001, the first defect detector 221 records a valid first flag in a first flag field corresponding to the cylinder number field with the cylinder number recorded therein.

Now, it is assumed that the first scan test by the first defect detector 221 have been executed on the entire recording surface (more specifically, the entire user area 115) of the disk 11. In this case, the track slip processor 240 in the main controller 24 executes a first track slip process (block 1002) as follows in accordance with a flowchart shown in FIG. 11.

First, the track slip controller 241 in the track slip processor 240 retrieves, from the defect management table 114a, defect position information indicative of the cylinder where the center of the defect detected during the first scan test is positioned (block 1101). The retrieval of the defect position information (block 1101) will be described in detail.

First, the track slip controller 241 references the defect management table 114a and thus identifies a group of entries in the defect management table 114a in which consecutive cylinder numbers have been recorded and in which the valid first flags have been recorded. A set of cylinders indicated by the consecutive cylinder numbers recorded in the identified group of entries is indicative of the radial range (that is, the detected location), on the disk 11, of the defect detected during the first scan test. That is, the track slip controller 241 identifies the detected location of the defect. The identified detected location corresponds to, for example, the detected location 631a shown in FIG. 6 and does not necessarily match the actual location of the defect detected during the first scan test.

The track slip controller 241 retrieves defect position information indicative of the cylinder number of a cylinder where, for example, the center of the identified detected location is positioned. The cylinder corresponds to the above-described first cylinder. Thus, the cylinder is hereinafter referred to as the first cylinder, and the cylinder number of the cylinder is hereinafter referred to as a first cylinder number CN1.

When the track slip controller 241 retrieves the above-described defect position information, block 1101 ends. Then, the yaw angle calculator 242 in the track slip processor 240 calculates the yaw angle θ_CN1 of the head 12 in accordance with Equation (1) based on the first cylinder number CN1 indicated by the defect position information retrieved by the track slip controller 241 (block 1102). In this case, θ and CN in Equation (1) may be replaced with θ_CN1 and CN1, when necessary.

The correction value calculator 243 in the track slip processor 240 calculates the correction value CVncyl in accordance with Equation (2) based on the position difference (design value) preset in the control program and the yaw angle θ_CN1 of the head 12 (block 1103). That is, the correction value calculator 243 converts the position difference PDIF into the correction value CVncyl based on the yaw angle θ_CN1 of the head 12. In this case, θ in Equation (2) may be replaced with θ_CN1, when necessary. As is also apparent from FIG. 9, the correction value CVncyl is a value with a positive or negative sign.

The yaw angle θ_CN1 of the head 12 depends on the position of the first cylinder on the disk 11 where the read element 122 of the head 12 is positioned (that is, the disk radial position). Thus, the correction value calculator 243 may convert the position difference PDIF into the correction value CVncyl based on the first cylinder number CN1 (that is, the disk radial position where the read element 122 is positioned) of the first cylinder.

The detected position compensator 244 in the track slip processor 240 corrects the first cylinder number CN1 to a second cylinder number CN2 in accordance with Equation (3) based on the correction value CVncyl (block 1104). That is, the detected position compensator 244 accurately calculates the second cylinder number CN2 of the second cylinder based on the cylinder number CN1 of the first cylinder and the correction value CVncyl. As described above, the first cylinder number CN1 is the cylinder number of the first cylinder where the read element 122 is positioned when a defect is detected by HDI sensor scan. The second cylinder number CN2 is the cylinder number of the second cylinder where the center of the HDI sensor 123 is positioned at the time of the detection.

The execution of block 1104 makes the second cylinder number CN2 larger than the first cylinder number CN1 given that the correction value CVncyl is positive. That is, the first cylinder number CN1 is corrected to the second cylinder number CN2 of the second cylinder positioned closer, by the absolute value of the correction value CVncyl, to the inner circumference than the first cylinder indicated by the first cylinder number CN1. In contrast, given that the correction value CVncyl is negative, the second cylinder number CN2 is smaller than the first cylinder number CN1. That is, the first cylinder number CN1 is corrected to the second cylinder number CN2 of the second cylinder positioned closer, by the absolute value of the correction value CVncyl, to the outer circumference than the first cylinder indicated by the first cylinder number CN1. The second cylinder number CN2 represents the corrected detected position (in this case, the center of the corrected detected location).

The track slip area determination module 245 in the track slip processor 240 determines a track slip area as follows based on the cylinder number CN2 (block 1105). The determination of the track slip area (block 1105) will be described in detail.

First, the track slip area determination module 245 corrects the detected location identified in block 1101 (that is, a set of cylinders indicated by consecutive cylinder numbers recorded in the identified group of entries) so that the cylinder positioned at the center of the detected location matches the second cylinder indicated by the second cylinder number CN2. That is, the track slip area determination module 245 corrects the location of the defect detected by HDI sensor scan (detected location) in the disk radial direction indicated by the sign of the correction value CVncyl, by the number of cylinders indicated by the correction value CVncyl. This direction is the inner direction of the disk 11 given that the sign of the correction value CVncyl is positive and is the outer direction of the disk 11 given that the sign of the correction value CVncyl is negative.

The detected location 731a shown in FIG. 7 indicates a location corrected as described above. Thus, the cylinder where the center of the corrected detected location 731a is positioned matches the cylinder where the center of the location at which the defect 500a is actually present is positioned. In contrast, the detected location 631a shown in FIG. 6 indicates the location of a defect detected by HDI sensor scan (that is, the uncorrected defect detected location). Thus, the cylinder where the center of the detected location 631a is positioned is significantly away from the center of the location where the defect 500a is actually present. That is, the embodiment accurately corrects the detected location 631a shown in FIG. 6 to the detected location 731a that is the actual location of the defect 500a.

As described above, the embodiment uses the cylinder number of the cylinder where the center of the identified detected location is positioned, as the first cylinder number needed to calculate the yaw angle θ_CN1. However, the cylinder number of a cylinder may be used which is present at a position other than the center of the identified detected location (for example, an inner circumferential side position or an outer circumferential side position of the identified detected location).

Upon correcting the location of the defect detected by HDI sensor scan, the track slip area determination module 245 determines a track slip area including the corrected detected location as follows. First, the track slip area determination module 245 determines an inner circumferential side extended area that contacts the corrected detected location on the inner circumferential side of the disk 11. The inner circumferential side extended area comprises a first inner circumferential side extended area and a second inner circumferential side extended area. The track slip area determination module 245 also determines an outer circumferential side extended area that contacts the corrected detected location on the outer circumferential side of the disk 11. The outer circumferential side extended area comprises a first outer circumferential side extended area and a second outer circumferential side extended area.

The first inner circumferential side extended area and the first outer circumferential side extended area are each a margin set to avoid a possible collision between the head 12 and a defect (media bump) and each include a predetermined number of cylinders. That is, the first inner circumferential side extended area and the first outer circumferential side extended area correspond to the first extended areas 732La and 732Ra, respectively, shown in FIG. 7.

The second inner circumferential side extended area and the second outer circumferential side extended area are each set to avoid positioning of the write element 121 and the read element 122 within the cylinder range in which the defect (media bump) is present. That is, the second inner circumferential side extended area and the second outer circumferential side extended area correspond to the second extended areas 733La and 733Ra, respectively, shown in FIG. 7.

The track slip area determination module 245 determines a track slip area including the corrected detected location, the first inner circumferential side extended area, the second inner circumferential side extended area, the first outer circumferential side extended area, and the second outer circumferential side extended area. Thus, block 1105 ends.

Then, the track slip area determination module 245 records the determined track slip area in the track slip management table 114b (block 1106). According to the embodiment, the track slip area is divided into all cylinders belonging to the track slip area, and is recorded in the track slip management table 114b in units of cylinders. That is, the cylinder numbers of all the cylinders belonging to the track slip are recorded in the track slip management table 114b as information indicative of the track slip area. However, information indicative of the cylinder range of the track slip area may be recorded in the track slip management table 114b as information indicative of the track slip area. The cylinder range is represented, for example, using a top cylinder number and a last cylinder number. The top cylinder number is indicative of the top cylinder of the cylinder range. The last cylinder number is indicative of the last cylinder of the cylinder range.

Then, the track slip controller 241 determines whether the defect management table 114a contains any further defect position information (that is, unprocessed defect position information) (block 1107). If the defect management table 114a contains further defect position information (Yes in block 1107), the track slip controller 241 returns to block 1101. In contrast, if the defect management table 114a contains no further defect position information (No in block 1107), the track slip controller 241 ends the first track slip process (block 1002).

Then, the track slip controller 241 allows the write element 121 in the head 12 to write test data (that is, a data signal with a single frequency) all over the recording surface of the disk 11 (more specifically, all data sectors in the user area 115) (block 1003). To write the test data, the track slip controller 241 allows the head 12 to scan the disk 11 via the servo controller 23. The track slip controller 241 supplies test data to the head IC 16 via the HDC 22 and the R/W channel 21. The head IC 16 converts the test data into a write current and outputs the write current to the write element 121 in the head 12.

When the test data is written to the recording surface (user area 115) of the disk 11 (block 1003), the second defect detector 222 in the HDC 22 executes a well-known scan test (that is, a second scan test) for detecting a defect on the recording surface (user area 115) by defect scan (block 1004). In block 1004, the second defect detector 222, upon detecting a defect cylinder (defect track), records defect position information indicative of the defect cylinder in a second entry in the defect management table 114a in the system area 114. The defect position information recorded in the second entry includes a valid second flag but does not include a valid first flag. That is, a valid flag is recorded only in one of the first and second flag fields of the second entry, that is, the second flag field. Thus, the defect position information in the second entry is indicative of the cylinder number of a defect cylinder detected only by defect scan.

It is assumed that defect position information indicative of a detected defect cylinder has already been recorded in the first entry in the defect management table 114a during the previously executed first scan test (1001). In this case, the second defect detector 222 records a valid second flag in the second flag field of the first entry. The valid first flag has already been recorded in the first flag field of the first entry. Thus, the defect position information in the first entry is indicative of the cylinder number of a defect cylinder detected both by HDI sensor scan and by defect scan.

The second defect detector 222 is assumed to have executed the second scan test on the entire recording surface (more specifically, the entire user area 115) of the disk 11. In this case, the track slip processor 240 executes a well-known second track slip process (block 1005). That is, the track slip processor 240 determines a track slip area as shown in FIG. 5 based on defect position information recorded in the defect management table 114a and indicating the position of a defect detected during a defect scan test. The track slip processor 240 records the determined track slip area in the track slip management table 114b. At least a part of the track slip area determined by the second track slip process is assumed to overlap the track slip area recorded in the track slip management table 114b by the first track slip process. In this case, the track slip processor 240 merges both track slip areas into one track slip area.

According to the embodiment, the first scan test using HDI sensor scan (block 1001) precedes the second scan test using defect scan (block 1004). When a defect, for example, a media bump on the recording surface of the disk 11 is detected during the first scan test, the cylinder range including the detected location and the periphery thereof is recorded in the track slip management table 114b as a track slip area during the first track slip process (block 1002). Thus, during write/read operation in the subsequent test data write (block 1003) and second scan test (block 1004), the head 12 (more specifically, the write element 121 and the read element 122 in the head 12) can be prevented from colliding against (contacting) the media bump. However, when the track slip area is away, in the disk radial direction, from the location where the media bump is actually present, preventing a possible collision between the head 12 and the media bump is difficult. In this case, the defect detection and recording process may degrade (damage) the head 12.

Thus, the track slip area including the detected location is expected to be fully extended with a shift of the detected position taken into account. However, fully extending the track slip area reduces locations available as data areas. This may preclude a storage capacity needed for the magnetic disk drive from being achieved. Hence, for securement of the needed storage capacity, the surface recording density of the recording surface of the disk 11 is expected to be increased by reducing the track pitch TP. However, the increased surface recording density makes predetermined write/read characteristics difficult to achieve, thereby contributing to increasing a fraction defective.

In contrast, the embodiment can correct a location where a defect such as a media bump is detected during the first scan test using HDI sensor scan so that the location is indicative of the position of the HDI sensor 123 at the time of detection of the defect. That is, the location where the defect is detected can be corrected to the location where the defect is actually present (that is, the accurate detected location). Thus, the embodiment can determine a track slip area based on the accurate detected location, thereby preventing a possible collision between the head 12 and the defect without extending the track slip area more than necessary. Consequently, the head 12 can be prevented from being degraded. Furthermore, since the track slip area is prevented from being extended more than necessary, the number of locations available as data areas can be increased. This enables the storage capacity needed for the magnetic disk drive to be achieved. Furthermore, the embodiment eliminates the need to increase the surface recording density in order to secure the needed storage capacity, thus allowing a possible increase in fracture defective affected by the write/read characteristics to be prevented.

According to the embodiment, both defects detected during the first scan test and defects detected during the second scan test are recorded in the same defect management table 114a. However, defects detected during the first scan test and defects detected during the second scan test may be recorded in different defect management tables. In this case, information indicative of the cylinder range of the location of the detected defect (detected location) may be recorded in the defect management table.

For simplification of description, the embodiment assumes that the defect detection and recording process is intended for the user area 115 on the recording surface of the disk 11. However, the defect detection and recording process intended for the system area 114 is carried out as is the case with the embodiment. However, the defect detection and recording process intended for the system area 114 hinders the defect management table 114a and the track slip management table 114b from being stored in the system area 114. Thus, exclusively during the defect detection and recording process intended for the system area 114, the defect management table 114a and the track slip management table 114b may be temporarily stored, for example, in a predetermined area in the FROM 25. Furthermore, when the FROM 25 has extra areas, the defect management table 114a and the track slip management table 114b may be constantly stored in the FROM 25.

When the defect detection and recording process is executed during an operation of manufacturing the magnetic disk drive shown in FIG. 1 (more specifically, a drive adjustment operation), a test device is used as a host connected to the HDC 22 in the drive via a host interface HIF. In this case, exclusively during the defect detection and recording process intended for the system area 114, the defect management table 114a and the track slip management table 114b may be temporarily stored in a storage device of the test device. Furthermore, the head disk assembly (HDA) is incorporated into the test device, which may execute the defect detection and recording process.

Furthermore, the HDI sensor 123 applied in the embodiment is a thermal sensor that comprises an MR element and electrically detects thermal interference acting between the HDI sensor 123 (the head 12 comprising the HDI sensor 123) and the disk 11. However, the HDI sensor 123 may be a pressure sensor comprising a piezoelectric element that electrically detects pressure acting between the HDI sensor 123 and the disk 11.

<Modification>

Now, a modification of the embodiment will be described. The embodiment uses a design value as the position difference PDIF. The modification is characterized in that the position difference PDIF is calculated. Thus, according to the modification, the first track slip process (block 1002) shown in FIG. 10 is executed in accordance with a procedure different from the procedure in the flowchart in FIG. 11.

Figure 12:
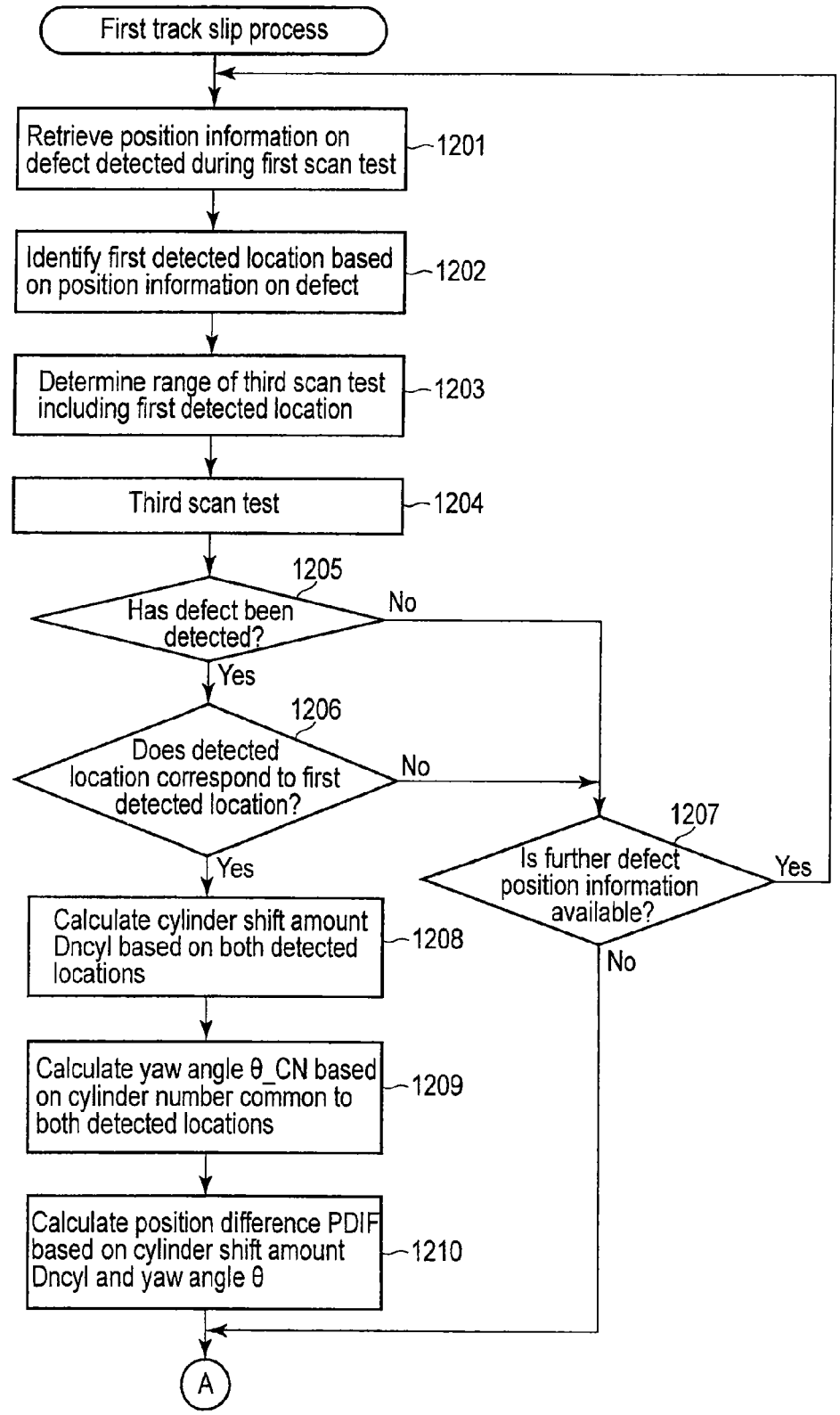
FIG. 12 is a diagram showing a part of a flowchart illustrating an exemplary procedure for the first track slip process according to a modification of the embodiment.
Figure 13:
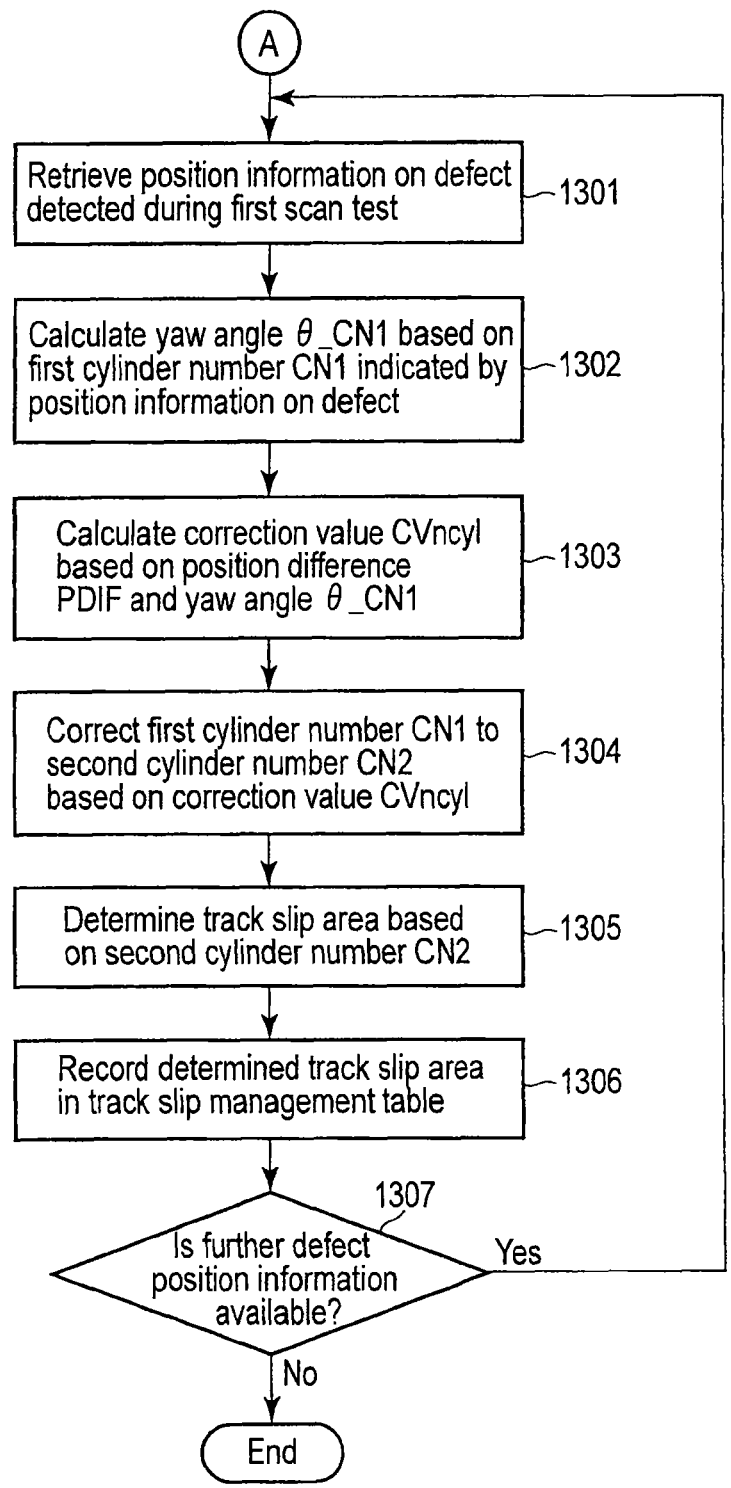
FIG. 13 is a diagram showing the remaining part of the flowchart illustrating the exemplary procedure for the first track slip process according to the modification.
Figure 14:
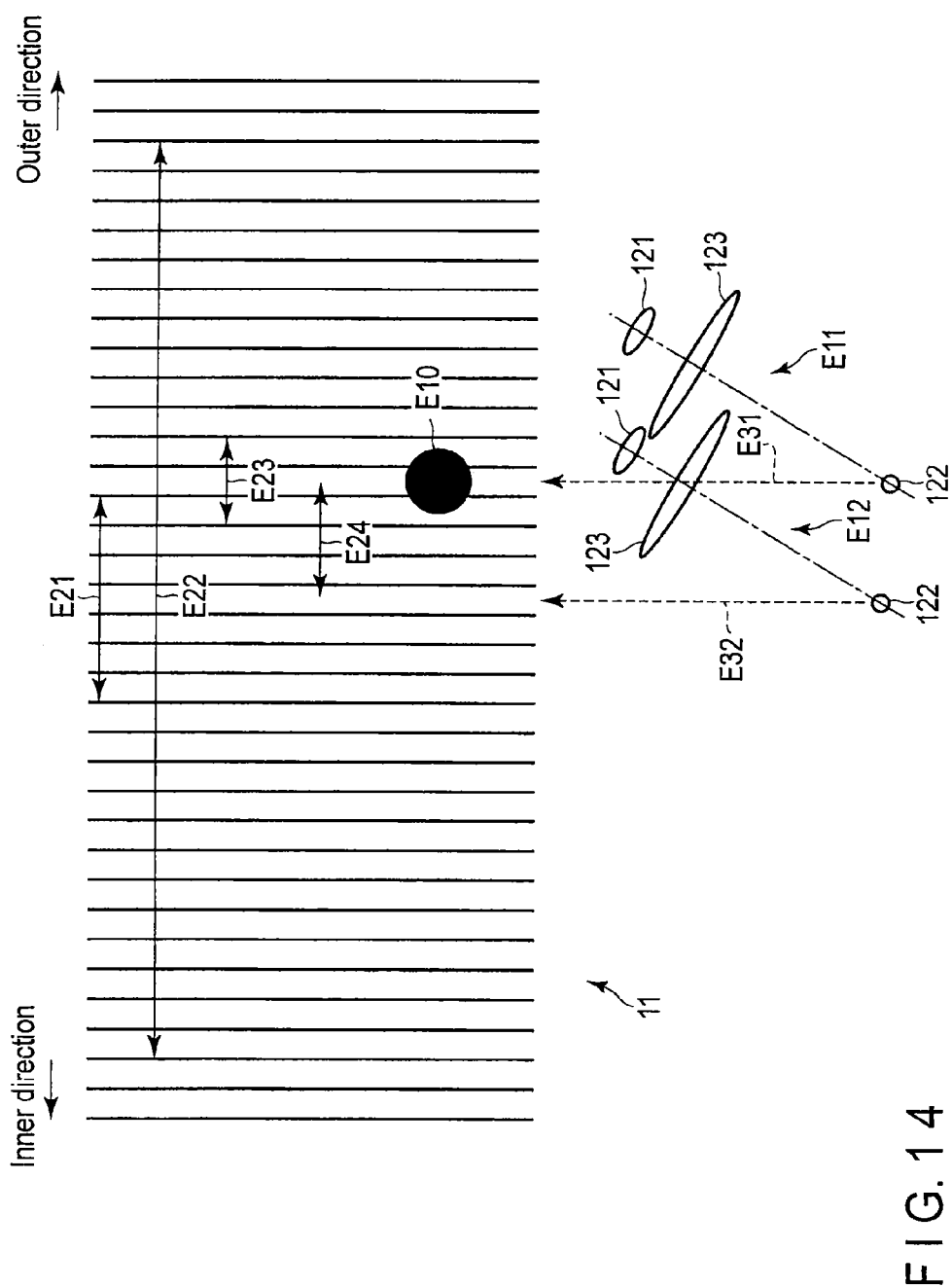
FIG. 14 is a diagram showing an example of the range of defect scan determined based on the location of a defect detected by HDI sensor scan according to the modification.

The first track slip process (block 1002) executed according to the modification will be described with reference to FIG. 12 to FIG. 14. FIG. 12 is a diagram showing a part of a flowchart illustrating an exemplary procedure for the first track slip process according to the modification. FIG. 13 is a diagram showing the remaining part of the flowchart. FIG. 14 is a diagram showing an example of the range of defect scan determined based on the location of a defect detected by HDI sensor scan (first scan test).

At the beginning of the first track slip process, the track slip controller 241 calculates the position difference PDIF using the shift amount calculator 246 and the position difference calculator 247 as described below. To perform this, the track slip controller 241 retrieves defect position information indicative of the position of a defect detected during the first scan test, from the defect management table 114a (block 1201). That is, the track slip controller 241 references the defect management table 114a and thus identifies groups of entries in the defect management table 114a in which consecutive cylinder numbers have been recorded and in which the valid first flag has been recorded. The track slip controller 241 retrieves the defect position information recorded in each of the identified groups of entries.

The retrieved defect position information is indicative of the cylinder numbers of cylinders within the radial range (that is, the detected location), on the disk 11, of a defect detected during the first scan test (HDI sensor scan). Thus, the track slip controller 241 identifies the detected location (hereinafter referred to as the first detected location) based on the retrieved defect position information (block 1202). In this case, a detected location E21 shown in FIG. 14 is assumed to be identified as the first detected location. The detected location (first detected location) E21 corresponds to the detected location 631a shown in FIG. 6.

In the outer circumferential side cylinder of the first detected location E21, the read element 122 is positioned when the inner circumferential side end of the HDI sensor 123 is positioned at the outer circumferential side end of the defect E10 shown in FIG. 14. In the inner circumferential side cylinder of the first detected location E21, the read element 122 is positioned when the outer circumferential side end of the HDI sensor 123 is positioned at the inner circumferential side end of the defect E10 shown in FIG. 14. The first detected location E21 is away from the actual location of the defect E10, depending on the yaw angle of the head 12.

The position difference PDIF can be calculated to be the amount of shift (the number of cylinders) between the first detected location E21 and the actual location of the defect E10. The actual location of the defect E10 can be detected by defect scan. Thus, based on the identified first detected location E21, the track slip controller 241 determines the range E22 of defect scan (hereinafter referred to as a third scan test) including the first detected location E21 (block 1203). The range E22 of the third scan test (defect scan) comprises the first detected location E21, the inner circumferential side extended area contacting the first detected location E21 on the inner circumferential side of the disk 11, and the outer circumferential side extended area contacting the first detected location E21 on the outer circumferential side of the disk 11. The inner circumferential side extended area and the outer circumferential side extended area each comprise a predetermined number of cylinders (in the example in FIG. 12, 12). However, when the defect E10 is present near the inner or outer circumference of the recording surface of the disk 11, the predetermined number of cylinders for the inner or outer circumferential side extended area may be prevented from being secured. In such a case, the inner circumferential side extended area or the outer circumferential side extended area may comprise the maximum available number of cylinders.

The second defect detector 222 executes a third scan test (that is, a scan test using defect scan) over the determined range E22 on the recording surface of the disk 11 (block 1204). The third scan test is executed similarly to the second scan test except that the third scan test involves a scan range different from the scan range of the second scan test.

When a defect is detected during the third scan test, the second defect detector 222 notifies the track slip controller 241 of the location of the detected defect (cylinder range). In contrast, when no defect is detected during the third scan test, the second defect detector 222 notifies the track slip controller 241 of the failure to detect a defect during the third scan test.

The track slip controller 241 determines whether a defect has been detected during the third scan test based on the notification from the second defect detector 222 (block 1205). If a defect is detected during the third scan test (Yes, in block 1205), the track slip controller 241 compares the detected location (hereinafter referred to as a third detected location) with the first detected location E21 and thus determines whether the third detected location corresponds to the first detected location E21 (block 1206).

According to the embodiment, the track slip controller 241 determines that the third detected location corresponds to the first detected location E21 when at least one cylinder in the third detected location is also included in the first detected location E21 (Yes in block 1206). That is, when both the third detected location and the first detected location E21 include at least one common cylinder (same cylinder), the track slip controller 241 determines that the third detected location corresponds to the first detected location E21. In this case, the track slip controller 241 determines that the defect E10 detected during the first scan test (HDI sensor scan) as the first detected location E21 has also been detected during the third scan test (defect scan).

The third detected location is assumed to be a detected location E23 shown in FIG. 14. The detected location E23 is referred to as the third detected location E23. The third detected location E23 corresponds to the detected location 531a shown in FIG. 5.

As is apparent from FIG. 14, both the third detected location E23 and the first detected location E21 include one common cylinder. In this case, the track slip controller 241 determines that the third detected location E23 corresponds to the first detected location E21 (Yes in block 1206).

In FIG. 14, a state E11 indicates that, during the third scan test, the read element 122 is positioned at the center of a defect E10 (that is, the center of the third detected location E23). In FIG. 14, a state E12 indicates that, during the first scan test, the read element 122 is positioned at the center of the first detected location E21, which is away from the defect E10.

Based on both the third detected location E23 and the first detected location E21, the shift amount calculator 246 in the track slip processor 240 calculates the amount Dncyl of shift between the centers of both detected locations in the disk radial direction (hereinafter referred to as the cylinder shift amount Dncyl) (block 1208). That is, the shift amount calculator 246 calculates the cylinder shift amount Dncyl by subtracting the cylinder number of the cylinder where the center of the first detected location E21 is positioned from the cylinder number of the cylinder where the center of the third detected location E23 is positioned. The cylinder shift amount Dncyl is a value with the positive or negative sign expressed in terms of the number of cylinders.

In the example in FIG. 14, the cylinder where the center of the third detected location E23 is positioned is the cylinder where the read element 122 is positioned in the state E11 as shown by arrow E31. Furthermore, the cylinder where the center of the first detected location E21 is positioned is the cylinder where the read element 122 is positioned in the state E12 as shown by arrow E32. Thus, in the example in FIG. 14, the cylinder shift amount Dncyl is calculated to be −4. The absolute value of the cylinder shift amount Dncyl (=−4) is equal to a value acquired by subtracting 1 from the number of cylinders from the center of the first detected location E21 to the center of third detected location E23.

When the cylinder shift amount Dncyl is calculated (block 1208), the yaw angle calculator 242 calculates the yaw angle θ_CN of the head 12 at the position of the cylinder common to the third detected location E23 and the first detected location E21, in accordance with Equation (1) based on the cylinder number CN of the common cylinder (block 1209). Then, the position difference calculator 247 in the track slip processor 240 calculates the position difference PDIF in accordance with Equation (4) based on the cylinder shift amount Dncyl and the yaw angle θ_CN.

$$PDIF = Dncyl / \sin(\theta\_CN) \times TP \qquad (4)$$

The subsequent operation is similar to the operation in the first track slip process according to the embodiment. That is, blocks 1301 to 1307 (see FIG. 13) corresponding to blocks 1101 to 1107 in the flowchart in FIG. 11 are executed. However, in this case (more specifically, block 1303 corresponding to block 1103), the position difference PDIF calculated in block 1210 is used instead of the predetermined position difference PDIF (design value). Therefore, the modification allows the use of the position difference PDIF more compatible with the magnetic disk drive in FIG. 1 than the embodiment. Thus, the modification allows the location where a defect is detected during the first scan test using HDI sensor scan to be more accurately corrected to the location where the defect is actually present, than the embodiment.

On the other hand, when no defect is detected during the third scan test for the range determined in block 1203 (No in block 1205), the track slip controller 241 proceeds to block 1207 in order to determine the range of a next third scan test. Furthermore, when a defect is detected during the third scan test but the location of the detected defect fails to correspond to the first detected location (No in block 1206), the track slip controller 241 determines that the defect detected during the first scan test (HDI scan) as the first detected location has failed to be detected during the third scan test (defect scan). Also in this case, the track slip controller 241 proceeds to block 1207 in order to determine the range of a next third scan test.

In block 1207, the track slip controller 241 determines whether the defect management table 114a contains further defect position information (that is, unprocessed defect position information). If the defect management table 114a contains further defect position information (Yes in block 1207), the track slip controller 241 returns to block 1201. In contrast, if the defect management table 114a contains no further defect position information (No in block 1207), the track slip controller 241 determines that the position difference PDIF has failed to be calculated. In this case, blocks 1301 to 1307 corresponding to blocks 1101 to 1107 in the flowchart in FIG. 11 are executed. In this case (more specifically, block 1303 corresponding to block 1103), the predetermined position difference PDIF (design value) is used as is the case with the embodiment.

The above-described at least one embodiment can correct the location detected as a defect using the HDI (head disk interference) sensor (that is, the location where the read element is positioned when the defect is detected) to the actual location of the defect.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk drive comprising:
    a head comprising a read element and a head disk interference sensor, the head disk interference sensor being configured to electrically detect interference acting between a disk and the head;
    a first defect detector configured to execute a first scan test, the first scan test comprising detecting a defect on the disk using the head disk interference sensor by scanning the disk using the head, and identifying a range of cylinders indicated by servo data read by the read element when the defect is detected, as a first detected location of the detected defect; and
    a compensator configured to correct the first detected location of the detected defect to a second detected location based on a position difference indicative of a distance between the read element and the head disk interference sensor, the second detected location corresponding to a position of the head disk interference sensor at a time of detection of the defect.

2. The magnetic disk drive of claim 1, further comprising a correction value calculator configured to calculate a correction value based on the position difference and a yaw angle of the head or a radial position of the read element of the head on the disk, the correction value being indicative of a cylinder shift amount in a radial direction of the disk corresponding to the position difference,
    wherein the compensator is configured to correct the first detected location to the second detected location based on the correction value.

3. The magnetic disk drive of claim 2, further comprising:
    a second defect detector configured to detect a defect present within a cylinder range on the disk including the first detected location and a periphery of the first detected location, using the read element, and to identify a range of cylinders indicated by servo data read by the read element at a time of the detection as a third detected location of the defect detected using the read element;
    a shift amount calculator configured to calculate a cylinder shift amount between the first detected location and the third detected location in the radial direction of the disk; and
    a position difference calculator configured to calculate the position difference based on the calculated cylinder shift amount and the yaw angle of the head or the radial position of the read element of the head on the disk.

4. The magnetic disk drive of claim 3, further comprising a controller configured to determine whether the first detected location and the third detected location correspond to an identical defect based on whether the first detected location and the third detected location include a cylinder common to the first detected location and the third detected location, and to allow the second defect detector to detect a defect present within a cylinder range on the disk including a first detected location of another defect detected by the first defect detector and a periphery of the first detected location when the first detected location and the third detected location fails to correspond to the identical defect,
wherein the shift amount calculator is configured to calculate the cylinder shift amount when the first detected location and the third detected location correspond to the identical defect.

5. The magnetic disk drive of claim 4, wherein the correction value calculator is configured to use a design value as the position difference when the another defect is not present.

6. The magnetic disk drive of claim 4, further comprising a determination module configured to determine a cylinder range including the second detected location and a periphery of the second detected location to be a first track slip area on which data write by a write element and data read by the read element are to be avoided and to record information indicative of the first track slip area in a predetermined storage area, the head comprising the write element.

7. The magnetic disk drive of claim 6, wherein:
the second defect detector is configured to execute a second scan test when the first track slip area is determined based on the second detected location of each of all defects detected by the first scan test and the information indicative of the first track slip area is recorded in the predetermined storage area, the second scan test comprising detecting a defect on the disk using the read element by scanning an entire area on the disk except all the first track slip areas using the head and identifying a range of cylinders indicated by servo data read by the read element when the defect is detected as a fourth detected location of the defect detected using the read element; and
the determination module is configured to determine a cylinder range including the fourth detected location and a periphery of the fourth detected location to be a second track slip area on which data write by the write element and data read by the read element are to be avoided, and to record information indicative of the second track slip area in the predetermined storage area.

8. The magnetic disk drive of claim 2, wherein the correction value calculator is configured to use a design value as the position difference.

9. The magnetic disk drive of claim 1, further comprising a determination module configured to determine a cylinder range including the second detected location and a periphery of the second detected location to be a track slip area on which data write by a write element and data read by the read element are to be avoided, and to record information indicative of the track slip area in a predetermined storage area, the head comprising the write element.

10. A method, implemented in an apparatus comprising a head and a disk, for correcting a defective location detected using a head disk interference sensor, the head comprising a read element and the head disk interference sensor, the method comprising:
executing a first scan test, the first scan test comprising detecting a defect on the disk using the head disk interference sensor by scanning the disk using the head, and identifying a range of cylinders indicated by servo data read by the read element when the defect is detected, as a first detected location of the detected defect; and
correcting the first detected location of the detected defect to a second detected location based on a position difference indicative of a distance between the read element and the head disk interference sensor, the second detected location corresponding to a position of the head disk interference sensor at a time of detection of the defect.

11. The method of claim 10, further comprising calculating a correction value based on the position difference and a yaw angle of the head or a radial position of the read element of the head on the disk, the correction value being indicative of a cylinder shift amount in a radial direction of the disk corresponding to the position difference,
wherein the first detected location is corrected to the second detected location based on the correction value.

12. The method of claim 11, further comprising:
detecting a defect present within a cylinder range on the disk including the first detected location and a periphery of the first detected location, using the read element;
identifying a range of cylinders indicated by servo data read by the read element when the defect is detected using the read element, as a third detected location of the defect detected using the read element;
calculating a cylinder shift amount between the first detected location and the third detected location in the radial direction of the disk; and
calculating the position difference based on the calculated shift amount and the yaw angle of the head or the radial position of the read element of the head on the disk.

13. The method of claim 12, further comprising determining whether the first detected location and the third detected location correspond to an identical defect based on whether the first detected location and the third detected location include a cylinder common to the first detected location and the third detected location,
wherein:
detecting the defect using the read element comprises detecting, using the read element, a defect present within a cylinder range on the disk including a first detected location of another defect detected by the first scan test and a periphery of the first detected location when the first detected location and the third detected location fails to correspond to the identical defect; and
the position difference is calculated when the first detected location and the third detected location correspond to the identical defect.

14. The method of claim 13, wherein a design value is used as the position difference when the another defect is not present.

15. The method of claim 13, further comprising:
determining a cylinder range including the second detected location and a periphery of the second detected location to be a first track slip area on which data write by a write element and data read by the read element are to be avoided, the head comprising the write element; and
recording information indicative of the first track slip area in a predetermined storage area.

16. The method of claim 15, further comprising:
executing a second scan test when the first track slip area is determined based on the second detected location of each of all defects detected by the first scan test and the information indicative of the first track slip area is recorded in the predetermined storage area, the second scan test comprising detecting a defect on the disk using the read element by scanning an entire area on the disk except all the first track slip areas using the head and identifying a range of cylinders indicated by servo data read by the read element when the defect is detected as a fourth detected location of the defect detected using the read element; and determining a cylinder range including the fourth detected location and a periphery of the fourth detected location to be a second track slip area on which data write by the write element and data read by the read element are to be avoided; and recording information indicative of the second track slip area in the predetermined storage area.

17. The method of claim 10, wherein a design value is used as the position difference.

18. The method of claim 10, further comprising:

determining a cylinder range including the second detected location and a periphery of the second detected location to be a track slip area on which data write by a write element and data read by the read element are to be avoided, the head comprising the write element; and recording information indicative of the track slip area in a predetermined storage area.

* * * * *